(12) United States Patent
Itoi

(10) Patent No.: US 6,330,394 B1
(45) Date of Patent: Dec. 11, 2001

(54) RECORDING AND PLAYING-BACK DEVICE FOR USE IN A DISK AND METHOD OF CARRYING OUT RECORDING AND PLAYING-BACK

(75) Inventor: Satoshi Itoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/300,430

(22) Filed: Apr. 28, 1999

(30) Foreign Application Priority Data

Apr. 28, 1998 (JP) .................................................. 10-119547

(51) Int. Cl.[7] ...................................................... H04N 5/911

(52) U.S. Cl. ........................... 386/113; 386/116; 386/125

(58) Field of Search ................................. 386/21, 35, 40, 386/45, 113, 114, 116, 123, 125, 126; 369/47.16, 47.18, 47.2, 53.36, 59.23, 59.24

(56) References Cited

U.S. PATENT DOCUMENTS

| | | | |
|---|---|---|---|
| 5,758,013 | * | 5/1998 | Kizu et al. ............................ 386/123 |
| 5,805,537 | * | 9/1998 | Yamamoto et al. ............... 369/47.16 |
| 6,222,982 | * | 4/2001 | Kaneshige et al. ................... 386/125 |

\* cited by examiner

*Primary Examiner*—Thai Tran
*Assistant Examiner*—Christopher Onuaku
(74) *Attorney, Agent, or Firm*—Young & Thompson

(57) ABSTRACT

A signal subjected to compression coding and multiplexing by a video/audio coding circuit is subjected to signal processing such as shuffling by a recording signal processing circuit. A control ECC block generated by a control ECC block attaching circuit is multiplexed with video/audio data to be recorded on a disk. Data played back from the disk is subjected to processing such as deshuffling by a play-back signal processing circuit. The control ECC block is played back by a control ECC block playing-back circuit. Video/audio data is decoded by a video/audio decoding circuit to be output.

31 Claims, 24 Drawing Sheets

| BYTE POINT | THE NUMBER OF BYTES | CONTENTS |
|---|---|---|
| 0~15 | 16 | CON CONTROL DATA 0 |
| 16~31 | 16 | CON CONTROL DATA 1 |
| 32~47 | 16 | CON CONTROL DATA 2 |
| 48~63 | 16 | CON CONTROL DATA 3 |
| ⋮ | ⋮ | ⋮ |
| 32720~32735 | 16 | CON CONTROL DATA 2045 |
| 32736~32751 | 16 | CON CONTROL DATA 2046 |
| 32752~32763 | 12 | ALL "0" |
| 32764~32767 | 4 | EDC(CRCC) |

FIG. 3

| FID (8) | SFN (16) | SGN (24) | MFN (16) | MGN (24) | MTG (24) | RSV (16) |
|---|---|---|---|---|---|---|

FID7···FID0  SFN15···SFN0  SGN23······SGN0  MFN15···MFN0  MGN23······MGN0  MTG23······MTG0

FIG. 4

| FID (8) | SFN (16) | SCN (24) | MFN (16) | MCN (24) | MTC (24) | RSV (16) |
|---|---|---|---|---|---|---|

FID7···FID0  SFN15···SFN0  SCN23······SCN0  MFN15···MFN0  MCN23······MCN0  MTC23······MTC0

FIG. 5

| FID (8) | JFF (16) | JGF (24) | JFT (16) | JGT (24) | RSV (40) |

FID7···FID0  JFF15···JFF0  JGF23······JGF0  JFT15···JFT0  JGT23······JGT0

FIG. 6

| FID (8) | JFF (16) | JCF (24) | JFT (16) | JCT (24) | RSV (40) |

FID7···FID0  JFF15···JFF0  JCF23······JCF0  JFT15···JFT0  JCT23······JCT0

FIG. 7

| FID (8) | IFN (16) | ISN (24) | EFN (16) | ESN (24) | ETS (24) | RSV (16) |
|---|---|---|---|---|---|---|

FID7···FID0  IFN15···IFN0  ISN23······ISN0  EFN15···EFN0  ESN23······ESN0  ETS23······ETS0

FIG. 8

| FID (8) | IFA (16) | IEA (24) | EFA (16) | EEA (24) | IAR (16) | NAF (16) | RSV (8) |
|---|---|---|---|---|---|---|---|

FID7···FID0  IFA15···IFA0  IEA23······IEA0  EFA15···EFA0  EEA23······EEA0  IAR23······IAR0  NAF15···NAF0

FIG. 9

| BYTE POINT | THE NUMBER OF BYTES | CONTENTS |
|---|---|---|
| 0~7 | 8 | MAP DATA 0 |
| 8~15 | 8 | MAP DATA 1 |
| 16~23 | 8 | MAP DATA 2 |
| 24~31 | 8 | MAP DATA 3 |
| ⋮ | ⋮ | ⋮ |
| 32744~32751 | 8 | MAP DATA 4093 |
| 32752~32759 | 8 | MAP DATA 4094 |
| 32760~32763 | 4 | ALL "0" |
| 32764~32767 | 4 | EDC(CRCC) |

FIG. 10

| FID<br>(8 BITS) | GNR<br>(20 BITS) | AOF<br>(4 BITS) | AFR<br>(8 BITS) | SNR<br>(24 BITS) |
|---|---|---|---|---|

FID7···FID0  GNR19·········GNR0  AOF3···AOF0  AFR7···AFR0  SNR23·········SNR0

FIG. 11

| FID<br>(8 BITS) | CNR<br>(20 BITS) | CSG<br>(20 BITS) | CTG<br>(16 BITS) |
|---|---|---|---|

FID7···FID0  CNR19·········CNR0  CSG19·········CSG0  CTG15·········CTG0

FIG. 12

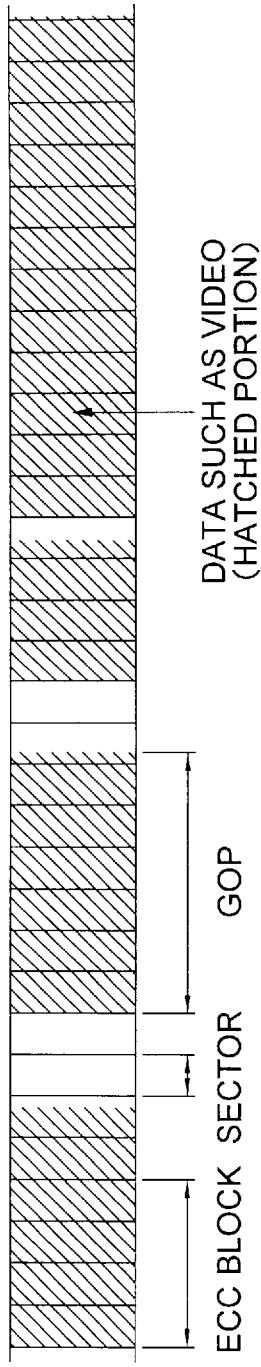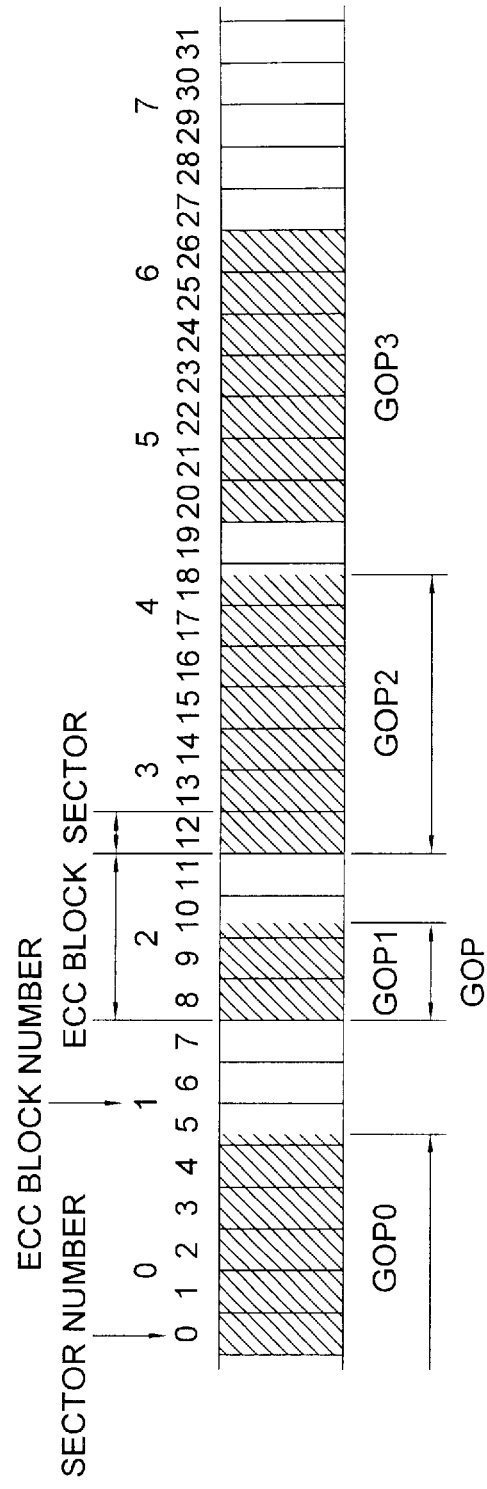

RECORDING AND PLAYING-BACK DEVICE FOR USE IN A DISK AND METHOD OF CARRYING OUT RECORDING AND PLAYING-BACK

BACKGROUND OF THE INVENTION

This invention relates to a recording and playing-back device, more particularly, to a recording and playing-back device which record a digital video image and audio or user data on a disk media such as a magneto-optical disk, a phase change disk, or a magnetic disk in order to play back the digital video image and audio or the user data.

As a conventional read only device for reading digital video data recorded on a disk, a digital versatile disk device (to be referred to as a DVD hereinafter) is known. The DVD is a disk, having a diameter of 12 cm, on which 4.7-Gbyte compressed digital video/audio data is recorded. When the data is read, video/audio signals can be played back for two or more hours. Similarly, as a device for recording/playing-back digital data on a disk, a digital versatile disk random access memory device (to be referred to as a DVD-RAM hereinafter) exists. This DVD-RAM is a device for recording 2.6-Gbyte digital data on a phase change disk having a diameter of 12 cm. A user can repeatedly record and play back the digital data from the disk.

By the way, navigation data may exist in the DVD. The navigation data is not video/audio data itself, and is disk management information which makes the video/audio data of the disk maximally effective. The disk management information is recorded on the entire surface of the disk once or a plurality of times, and has the following contents.

(1) A specific position where a program is stored, and the type of this program. The relationship between a program number and an address in header searching is recorded.

(2) Data for special play-backs (fast play-back, rewind play-back, and slow-motion play-back). Data which represents the number of times of a speed at which the head is jumped to the next address, and represents the next address is recorded.

(3) A specific address at which data is preferably played back when a multi-language (Japanese and English) is selected.

(4) A specific address at which data is preferably played back when a multi-angle (directions to the center fielder and the catcher in a broadcast on a baseball game) is selected.

(5) A specific address at which data is preferably played back when a multi-story (happy ending and sad ending) is selected.

When the DVD is a read only disk, the navigation data is not changed once the navigation data is recorded on the DVD. If the disk is programmable, the data can be changed. Data which can not be really used also exists on the disk. For example, in cases of the above-mentioned (1) and (2), since video/audio data is a variable length code, when the video/audio data is updated, the navigation data must be updated over a wide range. In cases of the above-mentioned (3), (4), and (5), multi-data cannot be recorded on real time in consideration of play-back synchronization. More specifically, the navigation data is made in consideration of a read only disk, but is not made in consideration of updating. With respect to a DVD-RAM, although an example of recorded video data is described above, video recording is not actually considered, and the concept of navigation data for recording video data does not exist.

SUMMARY OF THE INVENTION

It is an object of this invention to provide a recording and playing-back device capable of carrying out accurate header searching, a high-quality special play-back, and an edition for updated data at a high speed.

It is another object of this invention to provide a method of recording and playing-back capable of carrying out accurate header searching, a high-quality special play-back, and an edition for updated data at a high speed.

Other objects of this invention will become clear as the description proceeds.

According to a first aspect of this invention, there is provided a recording/playing-back device comprising a video/audio coding circuit for performing compression coding and multiplexing of an input video/audio signal, a control error correction code block generating circuit for generating a control error correction code block under the control of a central processing unit control circuit, a recording signal processing circuit for performing shuffling, addition of an error correction code, and record coding to an output signal of the video/audio coding circuit and for multiplexing the video/audio signal and the control error correction code block, an optical head for recording output data of the recording signal processing circuit on a disk, a play-back signal processing circuit for performing record code decoding, error correction, and deshuffling to data played back from the disk by the optical head, a video/audio decoding circuit for decoding video/audio data on the basis of an output of the play-back signal processing circuit to output the video/audio data as a video/audio signal, and a control error correction code block playing-back circuit for playing back a control error correction code block on the basis of an output of the play-back signal processing circuit and for causing the central processing unit control circuit to control the optical head and a spindle motor on the basis of the control error correction code block and an execution instruction.

According to a second aspect of this invention, there is provided a recording/playing-back method comprising the steps of performing compression coding and multiplexing to an input video/audio signal in a video/audio coding circuit, generating a control error correction code block from a control error correction code block generating circuit under the control of a central processing unit control circuit, performing shuffling, addition of an error correction code, and record coding to an output signal of the video/audio coding circuit and multiplexing the video/audio signal and the control error correction code block by a recording signal processing circuit, recording the multiplexed data on a disk by an optical head, performing record code decoding, error correction, and deshuffling to data played back from the disk by the optical head in a play-back signal processing circuit, causing a video/audio decoding circuit to decode video/audio data on the basis of an output of the play-back signal processing circuit, causing a control error correction code block playing-back circuit to play back a control error correction code block on the basis of an output of the play-back signal processing circuit, and causing the central processing unit control circuit to control the optical head and a spindle motor on the basis of the control error correction code block and an execution instruction.

BRIEF DESCRIPTION OF THE INVENTION

FIG. 3 is a diagram of a CON file;

FIG. 4 is a diagram of a data configuration in a COP merge edition mode;

FIG. 5 is a diagram showing data in a chapter merge edition mode in this invention.

FIG. 6 is a diagram of data in a GOP jump mode;

FIG. 7 is a diagram of data in a chapter jump mode;

FIG. 7 is a diagram of data in an edition jump information mode;

FIG. 9 is a diagram of data in an audio jump information mode;

FIG. 10 is a diagram of a MAP file;

FIG. 11 is a diagram of data in a GOP information mode;

FIG. 12 is a diagram of data in a chapter information mode;

FIG. 16 is a diagram for explaining a state in which data such as video is recorded on a disk;

FIG. 17 is a diagram for explaining recorded data on a disk;

DESCRIPTION OF THE PREFERRED EMBODIMENTS

Figure 1:
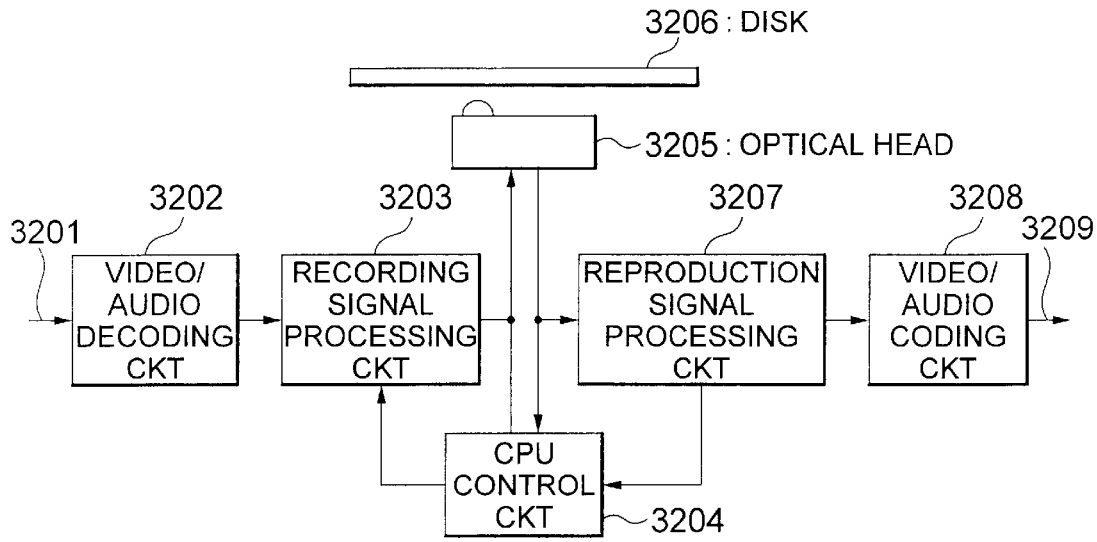
FIG. 1 is a block diagram of a conventional DVD-RAM.

Referring to FIG. 1, a conventional DVD-RAM will be described at first in order to facilitate an understanding of this invention. When a video/audio signal is set as an input 3201, this input 3201 is subjected to compression coding and multiplexing by a video/audio coding circuit 3202, and is subjected to shuffling and error correction code addition by a recording signal processing circuit 3203. An optical head 3205 is controlled by a central processing unit (to be referred to as a CPU hereinafter) control circuit 3204, and video/audio data output from the recording signal processing circuit 3203 is recorded on a disk 3206 by the optical head 3205. Data played back from the disk 3206 by the optical head 3205 is subjected to error correction and deshuffling by a play-back signal processing circuit 3207, and an optical head, a spindle motor, and the like are controlled by the central processing unit control circuit 3204. The video/audio data is decoded by a video/audio decoding circuit 3208, and a video/audio signal is output as an output 3209.

Figure 2:
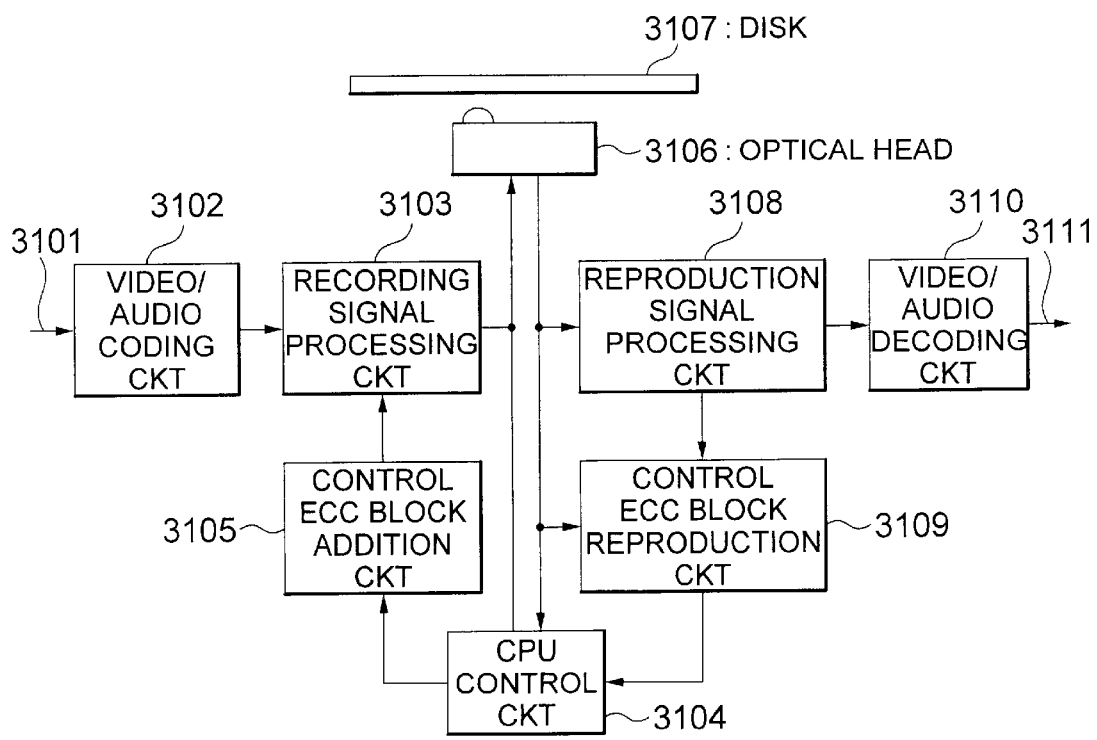
FIG. 2 is block diagram of a disk recording/playing-back device according to an embodiment of this invention.

Referring to FIG. 2, description will proceed to a disk recording/playing-back device according to an embodiment of this invention. Reference numeral 3102 denotes a video/audio coding circuit for performing compression coding and multiplexing an input video/audio signal 3101, 3105 denotes a control error correction code block attaching circuit for generating a control file under the control of a central processing unit control circuit 3104, 3103 denotes a recording signal processing circuit for performing shuffling, error correction code addition, and record coding for an output signal from the video/audio coding circuit 3102 and for multiplexing the video/audio signal from the video/audio coding circuit 3102 and the control error correction code block from the control error correction code block circuit 3015, 3106 denotes an optical head for recording output data from the recording signal processing circuit 3103 on a disk, 3108 denotes a play-back signal processing circuit for performing recorded code decoding, error correction, and deshuffling for data played back from a disk 3107 by the optical head 3106, 3110 denotes a video/audio decoding circuit for decoding video/audio data on the basis of a video/audio file output from the play-back signal processing circuit 3108 to output the code as a video/audio signal 3111, and 3109 denotes a control error correction code block playing-back circuit for decoding a control file output from the play-back signal processing circuit 3108 and causing the central processing unit control circuit 3104 to control the optical head 3106 and a spindle motor. In the following description, an error correction code is called an ECC (Error Correction Code). Accordingly, an error correction block is called an ECC block.

In this embodiment, a case in which compressed digital video/audio information is recorded on an optical disk serving as the disk 3107 will be described below. It is assumed that video information is compressed by MPEG-2 (Moving Picture Expert Group-2) method. In this case, a minimum unit of video information to be processed is called a GOP (Group of Pictures) serving as a main data group. The audio information is compressed by MPEG-1 and Layer-2. In this case, the minimum unit of audio information to be processed is called an audio frame. In addition, two Kbytes (2,048 bytes) is defined as one sector. ECCs are attached in units of 16 sectors (32 Kbytes, 32768 bytes) to constitute an ECC block.

On the optical disk, three types of control ECC blocks of a CON (Program Connection) file, a MAP (Program MAP, a VAS (Video Audio System) file serving as a video/audio file are recorded. Of these files, the CON file includes a GOP in one VAS file and connection information between chapters, or a GOP spreading between VAS files and connection information between chapters. The MAP file includes a GOP address, chapter information, and erase data information in the VAS file, and the VAS file a data stream such as video, audio, sub-picture, and system data conforming MPEG.

These three types of control ECC blocks will be described below in detail.

FIG. 3 shows the details of the CON file. This file is formed by the following manner. That is, one file is constituted by 32,768 bytes (=1 ECC block), and 12 ALL"0" bytes and four EDC bytes are added to CON control data 0 to CON control data 2046 (2047 rows) each having 16 bytes. A mode arrangement order in the control data is arbitrary set. An unused region is defined as ALLWOW. The CON file has six types of modes which will be described below.

GOP merge edition mode (GMM) is a mode in which edition is performed by only a change in play-back order without recording. Data in the same file or data in different files are merged in units of GOP. Therefore, in a recording data block to which an ECC is attached in units of ECC blocks, in addition to data ECC block, a control ECC block is arranged, and an insertion source file number, an insertion source main data group number, a merge addition file number, a merge addition main data group number, and the number of merge addition main groups are recorded, so that the GOP merge edition mode can be realized. A CON control data configuration in the COP merge edition mode is shown in FIG. 4. In FIG. 4, FID (FID7 to FID0) denotes a file ID, and FID7 to FID4 are set at "0000" to represent the GMM (GOP merge edition mode). FID3 to FID0 denote holding (ALL"0"). SFN (SFN15 to SFN0) denotes an insertion source file number representing a file number in which origin GOP to be merged exists. The file may be a program.

In addition, SGN (SGN23 to SGN0) denotes an insertion source GOP number representing an origin GOP number to be merged. MFN (MFN15 to MFN0) denotes a merge addition file number representing a file number in which GOP to be merge-attached exists. The file may be a program. MGN (MGN23 to MGN0) denotes a merge addition GOP number representing a GOP number to be merge-attached. MTG (MTG23 to MTG0) denotes the number of merge addition GOP representing the total number of GOP to be merge-attached. More specifically, after GOP in which a file and a number are respectively represented by SFN and SGN, GOP whose number represented by MTG are inserted from GOP in which a file and a number are respectively represented by MFN and MGN. RSV denotes holding (ALL"0").

Chapter merge edition mode (CMM) is a mode in which edition is performed by only a change in play-back order without recording. Data in the same file or data in different files are merged in units of chapters. Therefore, an insertion source file number, an insertion source chapter number, a merge addition file number, a merge addition chapter number, and the number of merge addition chapters are recorded on a control ECC block, so that the chapter merge edition mode can be realized. The file may be a program. The chapter is a unit which is smaller than a file, and is a set of one or more GOP. A user can divide a file into chapters during recording or after recording. At this time, one or more GOP is registered on a MAP file (to be described later) as one chapter. A CON control data configuration in the chapter merge edition mode is shown in FIG. 5. In FIG. 5, FID (FID7 to FID0) denotes a file ID, and FID7 to FID4 are set at "0001" to represent the CMM (chapter merge edition mode). FID3 to FID0denote holding (ALL"0"). SFN (SFN15 to SFN0) denotes an insertion source file number representing a file number in which an origin chapter to be merged exists. The file may be a program. SCN (SCN23 to SCN0) denotes an insertion source chapter number representing an origin chapter number to be merged.

In addition, MFN (MFN15 to MFN0) denotes a merge file number representing a file number in which a chapter to be merge-attached exists. The file may be a program. MCN (MCN23 to MCN0) denotes a merge addition chapter number representing a chapter number to be merge-attached. MTC (MTC23 to MTC0) denotes the number of merge addition chapters representing the total number of chapters to be merge-attached. MTC (MTC23 to MTC0) denotes the number of merge addition chapters representing the total number of chapters to be merge-attached. More specifically, after a chapter in which a file and a number are respectively represented by SFN and SCN, chapters whose number represented by MTC are inserted from a chapter in which a file and a number are respectively represented by MFN and MCN. RSV denotes holding (ALL"0").

GOP jump mode (GJP) is a mode in which edition is performed by only a change in play-back order without recording. Jumping is performed in units of GOP in the same file or between different files. Therefore, a jump source file number, a jump source main data group number, a jump destination file number, and a jump destination main data group number are recorded on a control ECC block, so that a main data group jump mode can be realized. A CON control data configuration in the GOP jump mode is shown in FIG. 6. In FIG. 6, FID (FID7 to FID0) denotes a file ID, and FID7 to FID4 are set at "0010" to represent the GJP (GOP jump mode). FID3 to FID0 denote holding (ALL"0"). JFF (JFF15 to JFF0) denotes a jump source file number representing a file number from which jumping is performed. The file may be a program.

In addition, JGF (JGF23 to JGF0) denotes a jump source GOP number representing a GOP number from which jumping is performed. JFT (JFT15 to JFT0) denotes a jump destination file number representing a file number to which jumping is performed. The file may be a program. JGT (JGT23 to JGT0) denotes a jump destination GOP number representing a GOP number to which jumping is performed. More specifically, jumping is performed from GOP in which a file and a number are respectively represented by JFF and JGF to GOP in which a file and a number are respectively represented by JFT and JGT. RSV denotes holding (ALL"0").

Chapter jump mode (CJP) is a mode in which edition is performed by only a change in play-back order without recording. Jumping is performed in units of chapters in the same file or between different files. Therefore, a jump source file number, a jump source chapter number, a jump destination file number, and a jump destination chapter number are recorded on a control ECC block, so that a chapter jump mode can be realized. The file may be a program. A CON control data configuration in the chapter jump mode is shown in FIG. 7. In FIG. 7, FID (FID7 to FID0) denotes a file ID, and FID7 to FID4 are set at "0011" to represent the CJP (chapter jump mode). FID3 to FID0 denote holding (ALLWOW). JFF (JFF15 to JFF0) denotes a jump source file number representing a file number from which jumping is performed. The file may be a program.

In addition, JCF (JCF23 to JCF0) denotes a jump source chapter number representing a chapter number from which jumping is performed. JFT (JFT15 to JFT0) denotes a jump destination file number representing a file number to which jumping is performed. The file may be a program. JCT (JCT23 to JCT0) denotes a jump destination chapter number representing a chapter number to which jumping is performed. More specifically, jumping is performed from a chapter in which a file and a number are respectively represented by JFF and JCF to a chapter in which a file and a number are respectively represented by JFT and JCT. RSV denotes holding (ALL"0").

Edition jump information mode (EJP) is a mode in which edition with recording/erasing is actually performed on a disk. Insert edition is performed for data in the same file or data between different files. When an order in which playback is performed in units of ECC blocks is changed, the order is designated. Therefore, an insertion source file number, an insertion source sector number, an edition addition file number, an edition addition sector number, and the number of edition addition sectors are recorded on a control ECC block, so that an edition jump information mode can be realized. The file may be a program. A CON control data configuration in the edition jump information mode is shown in FIG. 8. In FIG. 8, FID (FID7 to FID0) denotes a file ID, and FID7 to FID4 are set at "0100" to represent the EJP (edition jump information mode). FID3 to FID0denote holding (ALL"0"). IFN (IFN15 to IFN0) denotes an insertion source file number representing a file number from which insertion is performed. The file may be a program. ISN (ISN23 to ISN0) denotes an insertion source sector number representing a sector number from which insertion is performed.

EFN (EFN15 to EFN0) denotes an edition addition file number representing the file number of data subjected to edition addition. The file may be a program. ESN (ESN23 to ESN0) denotes an edition addition sector number which is a start sector number of data subjected to edition addition. ETS (ETS23 to ETS0) denotes the number of edition addition sectors which is the number of sectors of data subjected to edition addition. More specifically, after a sector in which a file and a number are respectively represented by IFN and ISN, sectors whose number represented by ETS are inserted from a sector in which a file and a number are respectively represented by EFN and ESN. RSV denotes holding (ALL"0").

Audio (sub-data) jump information mode (AJP) will be described. When video/audio is edited on a disk, a playing-back order of audio serving as sub-data in units of audio frames may have to be changed. In this case, the order is designated in the AJP. Therefore, an insertion source sub-data file number, an insertion source sub-data ECC block number, an edition addition sub-data file number, an edition addition sub-data ECC block number, an insertion source sub-data group number, and the number of edition addition sub-data groups are recorded on a control ECC block, so that the audio (sub-data) jump information mode can be realized. A CON control data configuration in the audio jump information mode is shown in FIG. 9. In FIG. 9, FID (FID7 to FID0) denotes a file ID, and FID7 to FID4 are set at "0101" to represent the AJP (audio jump information mode). FID3 to FID0 denote holding (ALL"0"). IFA (IFA15 to IFA0) denotes an insertion source audio file number which is a file number at which an audio frame of an insertion source exists. IEA (IEA23 to IEA0) denotes an insertion source audio ECC block number which is an ECC block number at which an audio frame of an insertion source exists.

In addition, EFA (EFA15 to EFA0) denotes an edition addition audio file number which is a file number at which the start portion of an audio frame subjected by edition addition exists. EEA (EEA23 to EEA0) denotes an edition addition audio ECC block number which is an ECC block number at which the start portion of an audio frame subjected to edition addition exists.

In addition, IAR (IAR15 to IAR0) denotes an insertion audio frame number which is an insertion source audio frame number in an ECC block IEA. NAP (NAF15 to NAF0) denotes the number of edition addition audio frames which is the number of audio frames subjected to edition addition. RSV denotes holding (ALL"0").

FIG. 10 shows the details of a MAP file. The MAP file includes a GOP address, chapter information, and erasing data information in a VAS file. This file is formed by the following manner. That is, one file is constituted by 32,764 bytes (=1 ECC block), and four ALLWOW bytes and four EDC bytes are added to MAP data 0 to MAP data 2046 (4095 rows) each having eight bytes. A mode arrangement order in the MAP file is arbitrary set. An unused region is defined as ALL"0". The MAP file has three types of modes which will be described below.

GOP information mode (GIM) is a mode in which the GOP address number of a VAS file corresponding to a MAP file is recorded. A MAP data configuration in the GOP information mode is shown in FIG. 11. In FIG. 11, FID (FID7 to FID0) denotes a file ID, and FID7 to FID4 are set at "1000" to represent the GIM (GOP information mode). FID3 to FID0 denote holding (ALL"0"). GNR (GNR19 to GNR0) denotes a GOP number having 20 bits to represent a GOP number. When video 1 GOP is constituted by 15 frames, a GOP number having 20 bits can cope with 145 hours. AOF (AOF3 to AOF0) denotes an audio offset to represent the number of an audio ECC block, at which audio frame data synthesized with the GOP indicated by the GNR is started, counted from the audio frame data. When the audio frame data is started from the next audio ECC block, the ECC block is defined as the 0th ECC block, and is represented by "0H".

AFR (AFR7 to AFR0) denotes an audio frame to represent the number of an audio frame of an audio ECC block indicated by an AOF at which audio data synthesized with GOP indicated by a GNR is started. When the audio data is started from the first audio frame, the first audio frame is defined as the 0th audio frame, and is represented by "00H". SNR (SNR23 to SNR0) denotes a sector number having. 24 bits to represent a sector number at which the GOP indicated by the GOP number is started. The sector number is represented by an offset address from the start sector number of the VAS file. Twenty MSBs represent an ECC block number. When one sector is constituted by 2 Kbytes, 24 bits can cope with a maximum of 33 Gbytes. For example, in order to store data of a recording time of 2 H (144,00 GOP), 4,095 GOP can be recorded per ECC block. For this reason, the GIM requires four ECC blocks.

Chapter information mode (CIM) is a mode in which chapter information of a VAS file corresponding to a MAP file is recorded. A MAP data configuration in the chapter information mode is shown in FIG. 12. In FIG. 12, FID (FID7 to FID0) denotes a file ID, and FID7 to FID4 are set at "1001" to represent the CIM (chapter information mode). FID3 to FID0 denote holding (ALL"0"). CNR (CNR19 to CNR0) denotes a chapter number having 20 bits to represent a chapter number. CSG (CSG19 to CSG0) denotes a start GOP number to represent a start GOP number corresponding to the chapter number. CTG (CTG15 to CTG0) denotes the total number of GOP to represent the total number of GOP corresponding to the chapter number.

Figure 13:
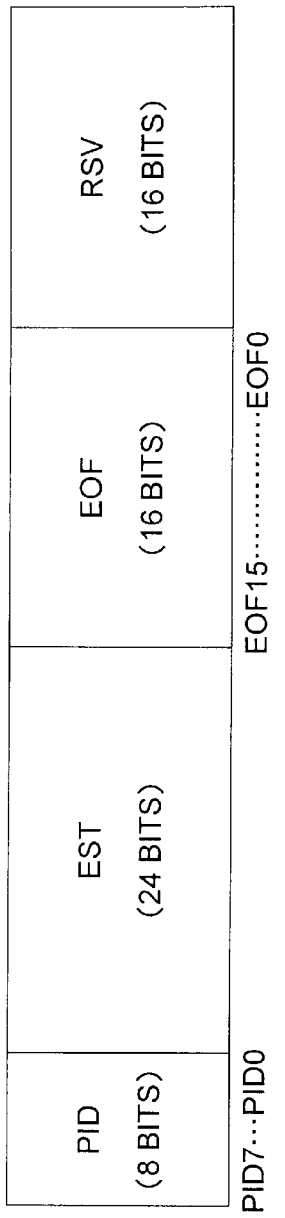
FIG. 13 is a diagram of data in an erasing display mode.

Erasing display mode (EDP) is a mode which represents erasing ECC block information to make an erasing position clear after partial erasing and to make it possible to use an erased ECC block again. A MAP data configuration in the erasing display mode is shown in FIG. 13. In FIG. 13, FID (FID7 to FID0) denotes a file ID, and FID7 to FID4 are set at "1010" to represent the EDP (erasing display mode). FID3 to FID0 denote holding (ALL"0"). EST (EST23 to EST0) denotes a erasing start sector number having 24 bits to represent a sector number at which partial erasing is started. The EST is represented by an offset address from the start sector number of VAS data. EOF (EOF15 to EOF0) denotes an erasing offset to represent the number of erased sectors.

The data configuration represents that sectors whose number is indicated by the EOF are erased from the sector number indicated by the EST. RSV denotes holding (ALL"0").

Figure 14:
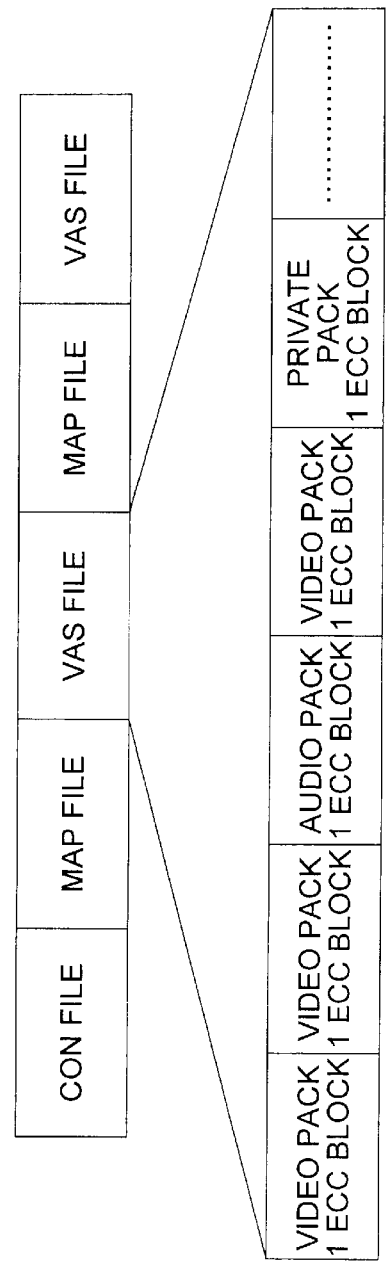
FIG. 14 is a diagram of the stream of a VAS file.

The VAS file is a data stream such as video, audio, sub-picture, and system data conforming MPEG-2. A stream of the VAS file is shown in FIG. 14 as an example. More specifically, the VAS file is constituted by a Video Pack, an Audio Pack, a Private Pack, and the like.

Figure 15:
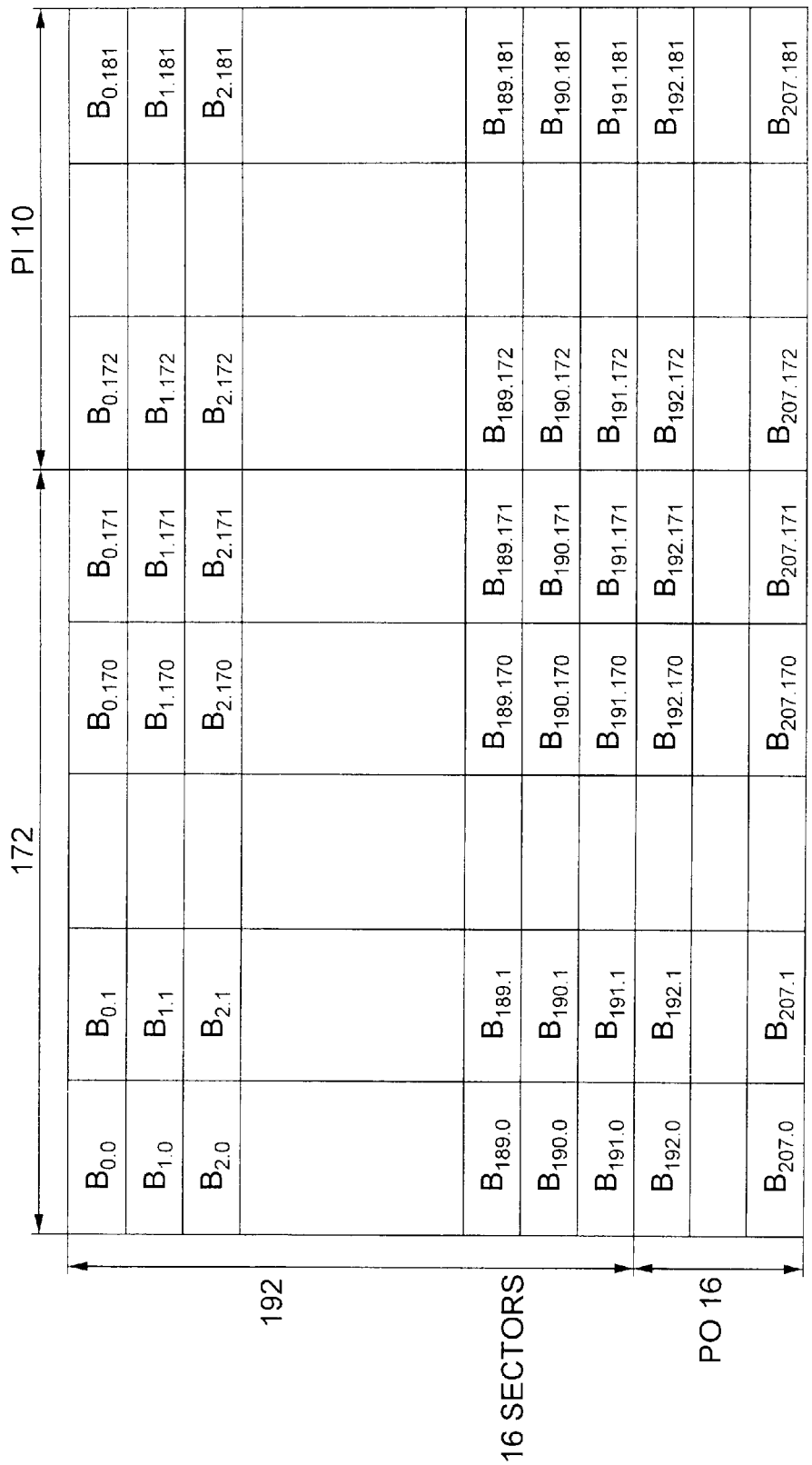
FIG. 15 is a diagram of an ECC block.

A case wherein functions of special play-back, edition, and the like are realized by using the control signal described above. FIG. 15 shows the ECC block as an example. GOP is aligned with the ECC block. More specifically, when the COP is ended in the middle of the ECC block, the remaining bits of the ECC block are filled with stuffing bits, and the GOP is necessarily started from the start of the next ECC block. In this example, a Pack length is set to be a length having 32 Kbytes (32,768 bytes).

FIG. 16 shows a state in which data such as video data is recorded on a disk. Referring to FIGS. 16 to 32, a dotted-line portion is shown as a sector, and a solid-line portion is shown as an ECC block. In these drawings, for descriptive convenience, one ECC block=four sectors is satisfied. A hatched portion indicates data such as recorded compressed video data, and one set indicates one GOP. A blank portion indicates a stuffing bit. FIG. 17 shows ECC blocks to which ECC block numbers, sector numbers, and GOP numbers are added. In FIG. 17, MAP data is as follows:

| GIM | GNR: | 0 | 1 | 2 | 3 |
|---|---|---|---|---|---|
|  | SNR: | 0 | 8 | 12 | 20 |

AOF (audio offset) and AFR (audio frame) are set to be unused (ALL"0").

Figure 18:
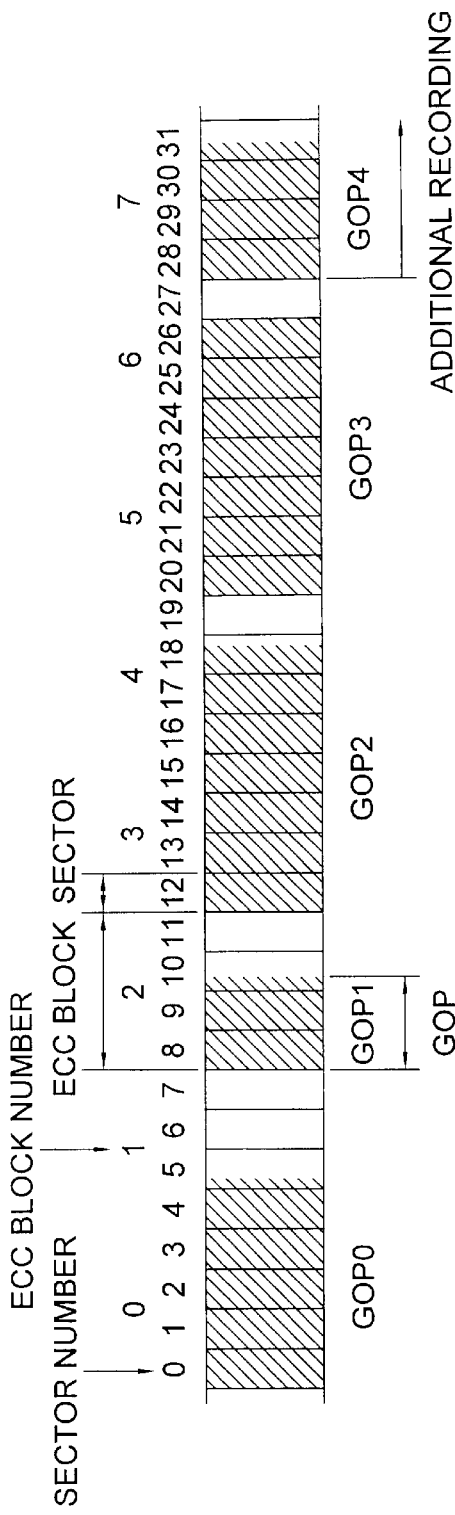
FIG. 18 is a diagram for explaining recorded data in an additional recording operation.

An additional recording operation will be described below. This additional recording is started from the next ECC block of the ECC block in which recording is ended. Recorded data at this time is shown in FIG. 18. In FIG. 18, GOP0 to GOP4 are recorded after additional recording, and MAP data is as follows:

| GIM | GNR: | 0 | 1 | 2 | 3 | 4 |
|---|---|---|---|---|---|---|
|  | SNR: | 0 | 8 | 12 | 20 | 28 |

AOF (audio offset) and AFR (audio frame) are set to be unused (ALL"0").

Figure 19:
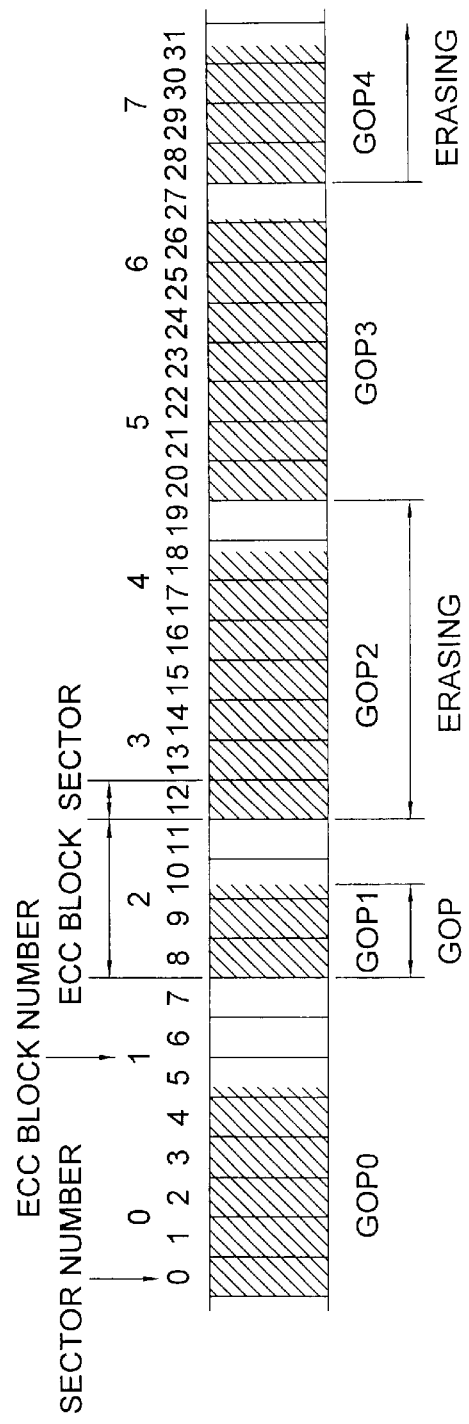
FIG. 19 is a diagram for explaining recorded data in an erasing operation.

An erasing operation after a designated point of partial erasing will be described below. FIG. 19 shows recorded data. In FIG. 19, in order to erase GOP2 and GOP4, MAP data is as follows:

| GIM | GNR: | 0 | 1 | 2 |
|---|---|---|---|---|
|  | SNR: | 0 | 8 | 20 |

GOP3 before erasing becomes GOP2 (GNR=2) because GOP2 is eliminated by erasing. AOF (audio offset) serving as a sub-data offset and AFR (audio frame) serving as a sub-data frame are set to be unused (ALL"0"). However, in this state, since the end position of GOP1 is not known, ECC blocks 3 to 4 cannot be used in the next recording. Therefore, erased ECC block information is represented by the erasing display mode (EDP) of MAP data.

| EDP | EST: | 12 |
|---|---|---|
|  | EOF: | 8 |

In this manner, it is understood that "eight sectors are erased from sector 12". The erased ECC block information represents that the region can be used in the next recording.

In the erasing operation, data may be actually erased, or the data may not be erased. When the data are actually erased, an ECC block to be erased is buried with stuffing bytes. At this time, the data which are recorded up to this disappear. On the other hand, when the data are not actually erased, all the data are not changed. In play-back, erasing of the data is determined by only MAP data. When new data is recorded on the portion, actual erasing is performed. After the erasing operation, the following merit can be obtained. That is, before actual erasing by recording the new data on the portion, the erased data can be recovered.

With respect to conversion from GOP into a chapter, additional recording in units of chapters, and erasing, in FIGS. 16 to 19, for example, edited GOP0 to GOP4 are shown such that the GOP0 to GOP4 are replaced with chapter 0 to chapter 4, respectively. At this time, MAP data is as follows:

| GIM | GNR: | 0 | 1 | 2 | 3 | 4 |
|---|---|---|---|---|---|---|
|  | SNR: | 0 | 4 | 12 | 20 | 28 |
| CIM | CNR: | 0 | 1 | 2 | 3 | 4 |
|  | CSG: | 0 | 1 | 2 | 3 | 4 |
|  | CTG: | 1 | 1 | 1 | 1 | 1 |

In this manner, it is represented that "chapter 0 to chapter 4 are equal to GOP0 to GOP4".

Figure 20:
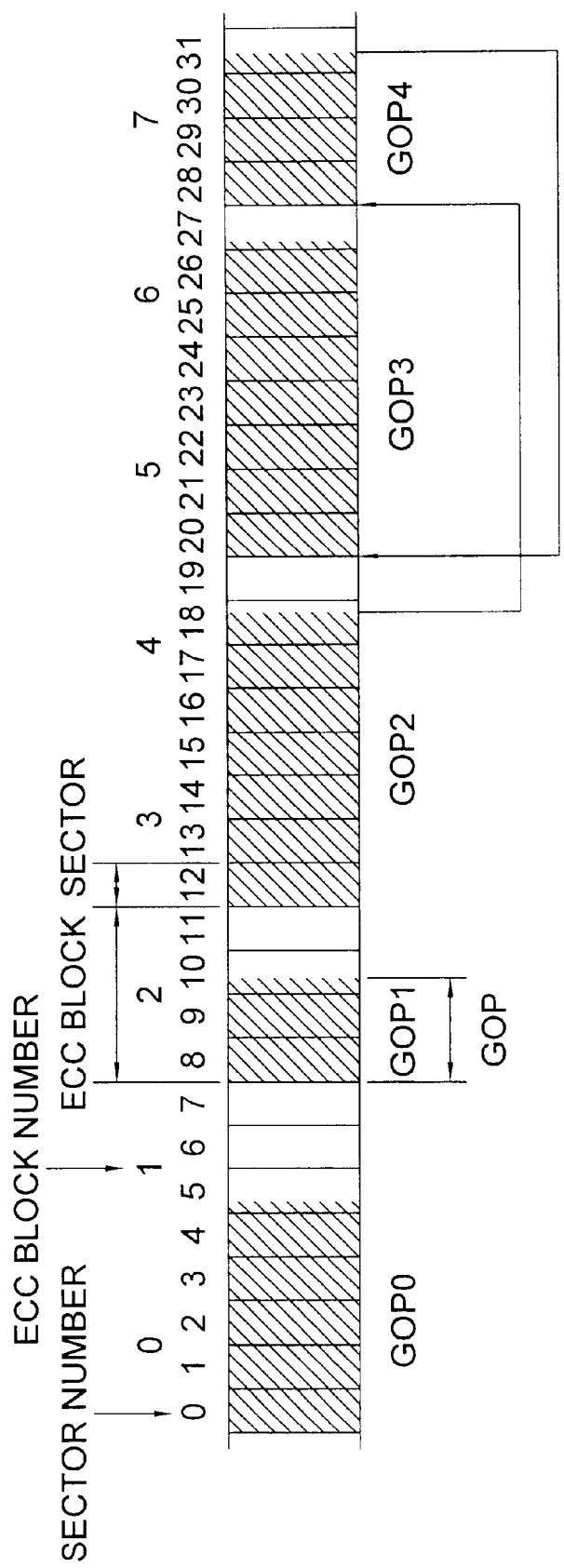
FIG. 20 is a diagram for explaining recorded data in a merging operation.

A merge operation in units of GOP will be described below. FIG. 20 shows recorded data. In FIG. 20, MAP data is as follows:

| GIM | GNR: | 0 | 1 | 2 | 3 | 4 |
|---|---|---|---|---|---|---|
|  | SNR: | 0 | 8 | 12 | 20 | 28 |

AOF (audio offset) and APR (audio frame) are set to be unused (ALL"0"). Assume that GOP0 to GOP2 are defined as file 1, and that GOP3 to GOP4 are defined as file 2. In this case, when GOP0 to GOP4 are played back in the order given by GOP0, GOP1, GOP2, GOP4, and GOP3, the following data are generated as a GOP merge edition mode (GMM) of a CON file:

| GMM | SFN: | 1 |
|---|---|---|
|  | SGN: | 2 |
|  | MFN: | 2 |
|  | MGN: | 4 |
|  | MTG: | 1 |

In this manner, it is represented that "one GOP is inserted from file 2, GOP4 into a position after file 1, GOP2". The same operation as described above can also performed by a GOP jump mode (GJP) of the CON file. In this case, the following data are generated:

| GJP | JFF: | 1 | 2 |
| | JGF: | 2 | 4 |
| | JFT: | 2 | 2 |
| | JGT: | 4 | 3 |

It is represented that "jumping is performed from file 1, GOP2 to file 2, GOP4", and that "jumping is performed from file 2, GOP4 to file 2, GOP3".

A merge operation in units of chapters will be described below. In FIG. 20, GOP0 to GOP4 are replaced with chapter 0 to chapter 4, respectively. At this time, MAP data is as follows:

| GIM | GNR: | 0 | 1 | 2 | 3 | 4 |
| | SNR: | 0 | 8 | 12 | 20 | 28 |
| CIM | CNR: | 0 | 1 | 2 | 3 | 4 |
| | CSG: | 0 | 1 | 2 | 3 | 4 |
| | CTG: | 1 | 1 | 1 | 1 | 1 |

It is represented that "chapter 0 to chapter 4 are equal to GOP0 to GOP4". Assume that chapter 0 to chapter 2 are defined as file 1, and that chapter 3 to chapter 4 are defined as file 2. In this case, when chapter 0 to chapter GOP4 are played back in the order given by chapter 0, chapter 1, chapter 2, chapter 4, and chapter 3, the following data are generated as a chapter merge edition mode (CMM) of a CON file:

| GMM | SFN: | 1 |
| | SCN: | 2 |
| | MFN: | 2 |
| | MCN: | 4 |
| | MTG: | 1 |

The data represent that "one chapter is inserted from file 2, chapter 4 into a position after file 1, chapter 2". The same operation as described above can also performed by a chapter jump mode (CJP) of the CON file. In this case, the following data are generated:

| CJP | JFF: | 1 | 2 |
| | JCF: | 2 | 4 |
| | JFT: | 2 | 2 |
| | JCT: | 4 | 3 |

It is represented that "jumping is performed from file 1, chapter 2 to file 2, chapter 4", and that "jumping is performed from file 2, chapter 4 to file 2, chapter 3".

Figure 21:
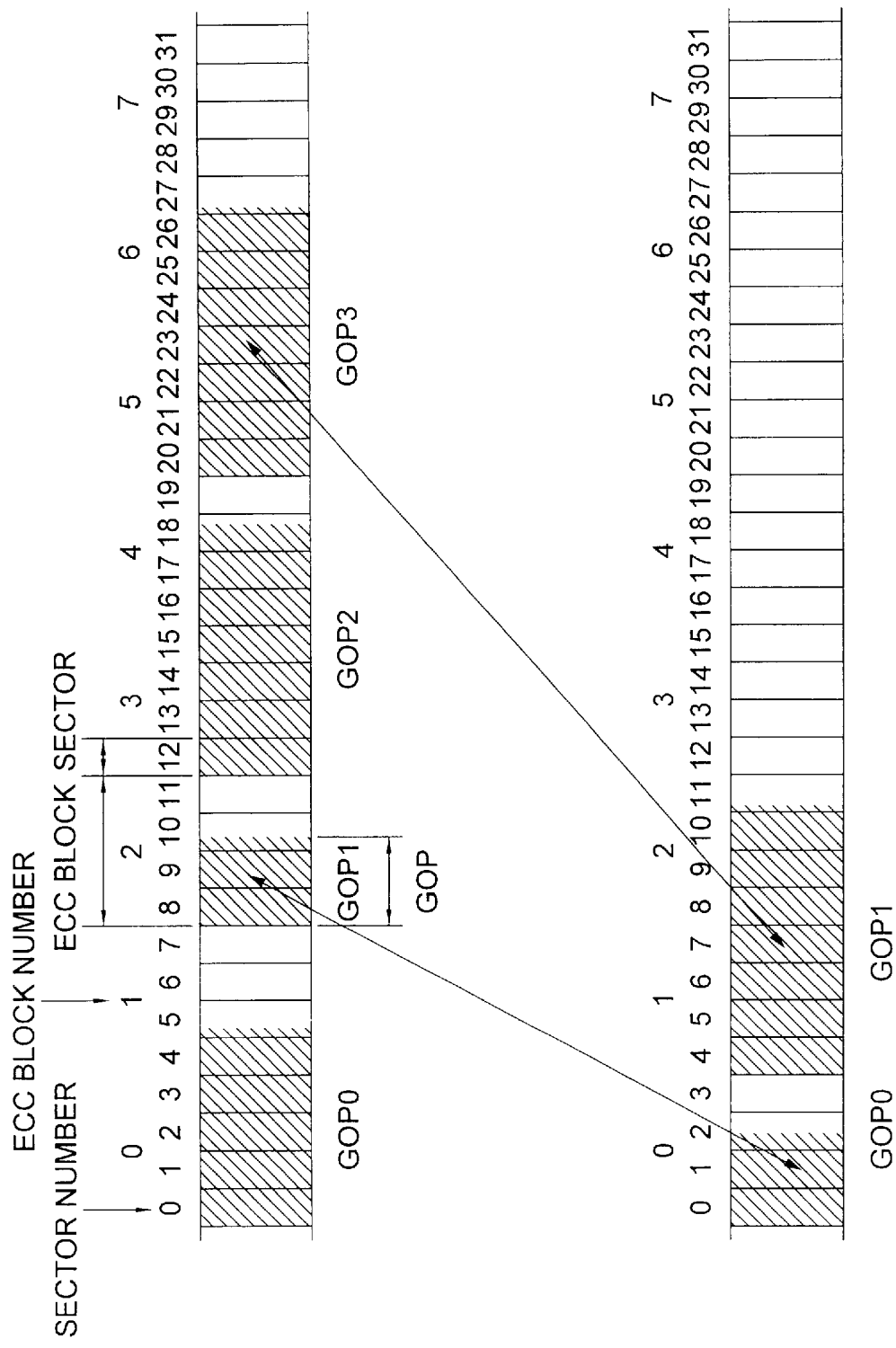
FIG. 21 is a diagram for explaining recorded data in a moving edition operation.

A move editing operation in units of GOP will be described below. Recorded data are shown in FIG. 21. In FIG. 21, MAP data before move edition is as follows:

| GIM | GNR: | 0 | 1 | 2 | 3 |
| | SNR: | 0 | 8 | 12 | 20 |

AOF (audio offset) and AFR (audio frame) are set to be unused (ALL"0"). Move edition is performed as indicated by arrows in FIG. 20. MAP data after move edition is as follows:

| GIM | GNR: | 0 | 1 |
| | SNR: | 0 | 4 |

GOP1 and GOP3 obtained before edition become GOP0 (GNR=0) and GOP1 (GNR=1), respectively, after edition. In this case, in GOP2 and GOP3 obtained before edition, data may be actually erased, or the data may not be erased. When the data are actually erased, an ECC block to be erased is buried with stuffing bytes. At this time, the recorded data disappear. On the other hand, when the data are not actually erased, all the data are not changed. In play-back, erasing of the data is determined by only MAP data. When new data is recorded on the portion, actual erasing is performed. After the erasing operation, the following merit can be obtained. That is, before actual erasing by recording the new data on the portion, the erased data can be recovered.

Move edition in units of chapters will be described below. In FIG. 21, GOP0 to GOP3 obtained before edition are replaced with chapter 0 to chapter 3, and GOP1 and GOP3 obtained after edition are replaced with chapter 1 and chapter 3. At this time, MAP data is as follows:

| GIM | GNR: | 0 | 1 |
| | SNR: | 0 | 4 |
| CIM | CNR: | 0 | 1 |
| | CSG: | 0 | 1 |
| | CTG: | 1 | 1 |

It is represented that "move edition is performed to GOP0 and GOP1, and chapter 0 and chapter 1 are equal to GOP0 and GOP1". AOF (audio offset) and AFR (audio frame) are set to be unused (ALL"0").

Figure 22:
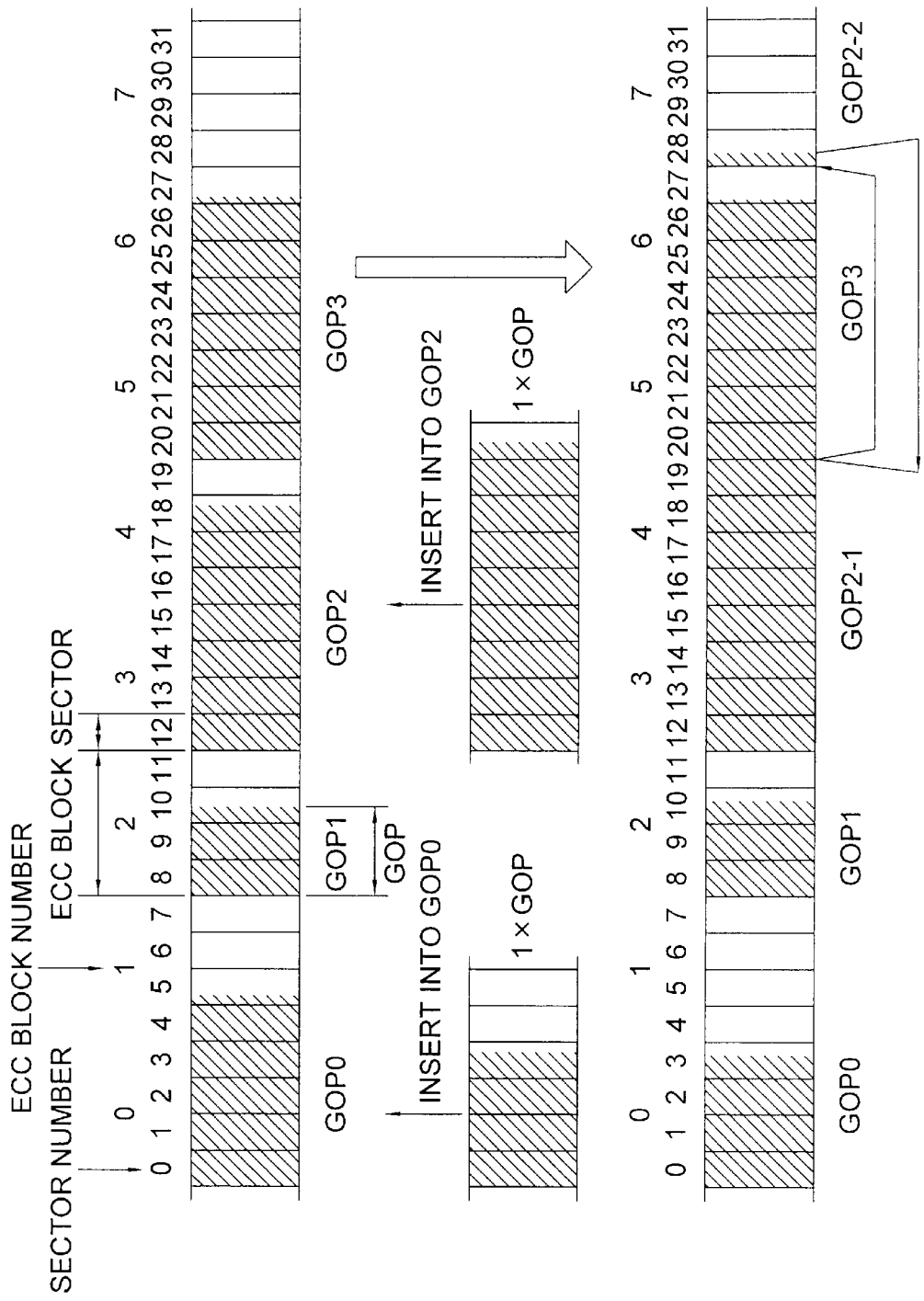
FIG. 22 is a diagram for explaining recorded data in insert edition.
Figure 23:
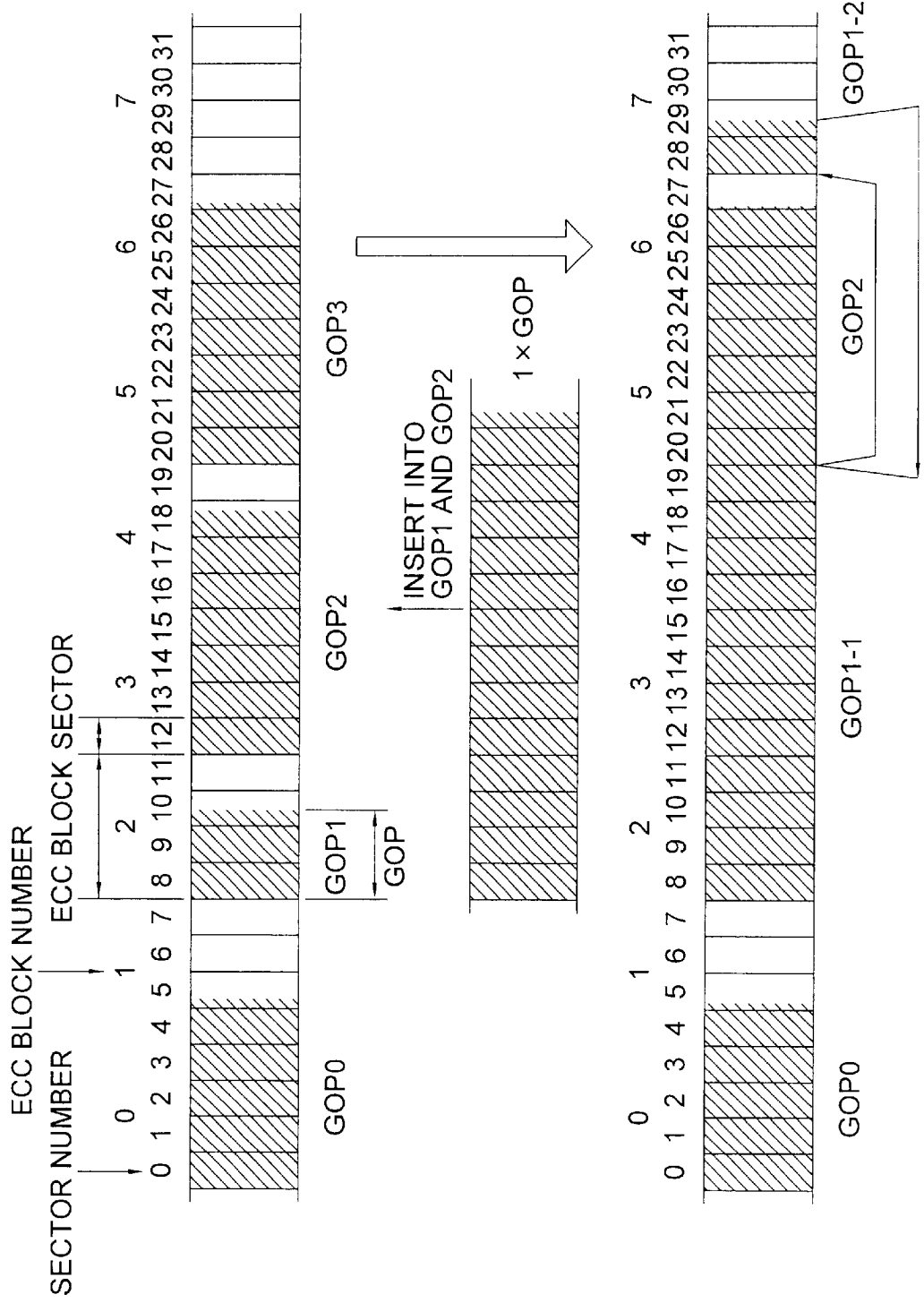
FIG. 23 is a diagram for explaining another recorded data in insert edition.
Figure 24:
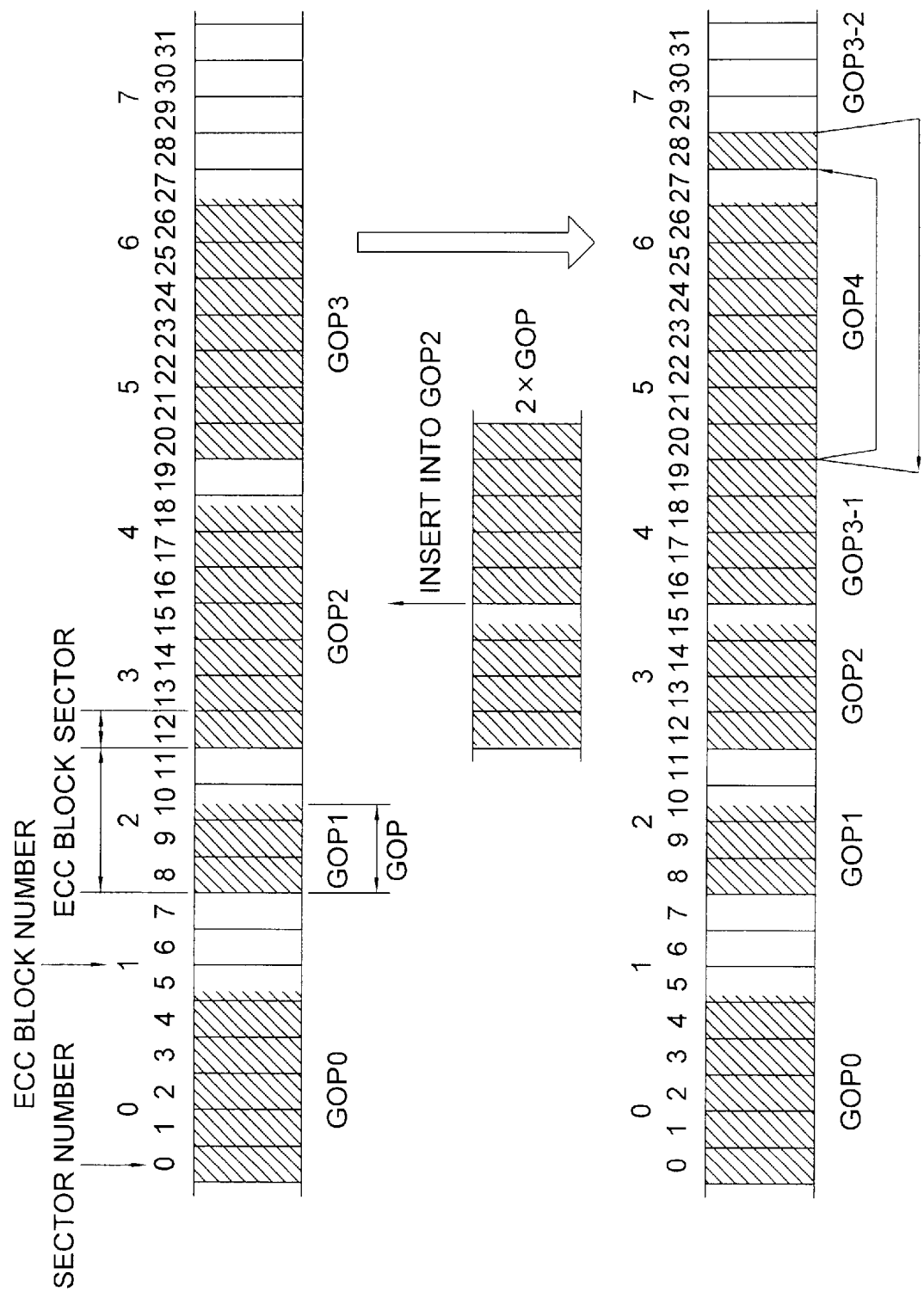
FIG. 24 is a diagram for explaining still another recorded data in insert edition.

Insert edition will be described below. FIG. 22 shows recorded data obtained in a case in which the number of GOP to be inserted is equal to the number of original GOP. FIG. 24 shows recorded data obtained in a case in which the number of GOP to be inserted is larger than the number of original GOP. In FIGS. 22 to 24, GOP0 to GOP3 are recorded before insert edition, and MAP data is as follows:

| GIM | GNR: | 0 | 1 | 2 | 3 |
| | SNR: | 0 | 8 | 1 | 20 |

AOF (audio offset) and AFR (audio frame) are set to be unused (ALL"0").

In the case that the number of GOP to be inserted is equal to the number of original GOP, when an amount of code of the GOP to be inserted is smaller than an amount of code of the original GOP, the remaining bytes are buried with stuffing after insert edition. In this example, insert edition is performed as in GOP0. On the other hand, when an amount of code of the GOP to be inserted is larger than an amount of code of the original GOP, the original GOP is entirely buried. Thereafter, the remaining data are written at another unrecorded position. The remaining part of the ECC block is buried with stuffing. In this example, GOP2 is divided into two parts. The first GOP2-1 is recorded on the third ECC block and the fourth ECC block, and the subsequent GOP2-2 is recorded on the seventh ECC block. Assume that GOP0 to GOP2 are defined as file 1, and that GOP3 is defined as file 2. In this case, an edition jump information mode (EJP) of a CON file is as follows:

| EJP | IFN: | 1 |
| | ISN: | 19 |
| | EFN: | 1 |
| | ESN: | 28 |
| | ETS: | 4 |

Since edition is performed in units of ECC blocks, ETS: 4 may be set. When data to be inserted is constituted by only one sector as shown in the drawing, ETS: 1 may be set. It is represented that "one to four sectors (one ECC block) are inserted from sector number 28 into a position after sector 19 by a CON file (EJP)". The MAP data obtained after edition is equal to the MAP data obtained before edition.

In the case that the number of GOP to be inserted is smaller than the number of original GOP, when an amount of code of the GOP to be inserted is smaller than an amount of code of the original GOP, although not shown, the remaining bytes are buried with stuffing after insert edition. In addition, when an amount of code of the GOP to be inserted is larger than an amount of code of the original GOP, the original GOP is entirely buried. Thereafter, the remaining data are written at another unrecorded position. The remaining part of the ECC block is buried with stuffing. In this example, GOP1 is divided into two parts. The first GOP1-1 is recorded on the second to fourth ECC blocks, and the subsequent GOP2-2 is recorded on the seventh ECC block. At this time, since the number of recorded GOP decreases, MAP data is as follows:

| GIM | GNR: | 0 | 1 | 2 |
| | SNR: | 0 | 8 | 20 |

When GOP0 to GOP2 are defined as file 1, an edition jump information mode (EJP) of a CON file is as follows:

| EJP | IFN: | 1 |
| | ISN: | 19 |
| | EFN: | 1 |
| | ESN: | 28 |
| | EST: | 4 |

Since edition is performed in units of ECC blocks, ETS: 4 may be set. When data to be inserted is constituted by only two sectors as shown in the drawing, ETS: 2 may be set. The CON file (EJP) represents that two to four sectors (one ECC block) are inserted from sector number 28 into a position after sector 19.

In the case that the number of GOP to be inserted is larger than the number of original GOP, when an amount of code of the GOP to be inserted is smaller than an amount of code of the original GOP, although not shown, the remaining bytes are buried with stuffing after insert edition. In addition, when an amount of code of the GOP to be inserted is larger than an amount of code of the original GOP, the original GOP is entirely buried. Thereafter, the remaining data are written at another unrecorded position. The remaining part of the ECC block is buried with stuffing. In this example, GOP3 is divided into two parts. The first GOP3-1 is recorded on the fourth ECC block, and the subsequent GOP3-2 is recorded on the seventh ECC block. At this time, since the number of recorded GOP increases, MAP data is as follows:

| GIM | GNR: | 0 | 1 | 2 | 3 | 4 |
| | SNR: | 0 | 8 | 12 | 16 | 20 |

When GOP0 to GOP2 are defined as file 1, an edition jump information mode (EJP) of a CON file is as follows:

| EJP | IFN: | 1 |
| | ISN: | 19 |
| | EFN: | 1 |
| | ESN: | 28 |
| | EST: | 4 |

Since edition is performed in units of ECC blocks, ETS: 4 may be set. When data to be inserted is constituted by only one sector as shown in the drawing, ETS: 1 may be set. The CON file (EJP) represents that one to four sectors (one ECC block) are inserted from sector number 28 into a position after sector 19.

The case in which only video data exists or the case in which video/audio data are simultaneously processed have been described above. However, a case in which video/audio data are independently processed will be described below. In case of MPEG-2, video images are processed in units of GOP. Since 1GOP=15 frames is generally satisfied, in the NTSC bloc including Japan, the United States, and the like, GOP has 2/1.001 Hz (0.5005 sec). In general MPEG-1 or Layer2, audio uses 1AF (audio frame)=1,152 samples as a compression unit. Therefore, a video GOP and an audio frame have no integer ratio. When a bit rate is, e.g., 256 kbps, an AF frequency is 48,000/1,152=41.67 Hz, and the number of bits per AF is 6,144 bits. The number of bits per GOP (0.5005 sec) is 128.128 kbits, and the number of AFs per GOP is 20.86. The number of ECC blocks required by audio per GOP is 0.49 (16,016 bytes), and the number of sectors required by audio per GOP is 7.82. The number of sectors for GOP having 20 APs is 7.5, and the number of sectors for GOP having 21 AFs is 7.875.

Figure 25:
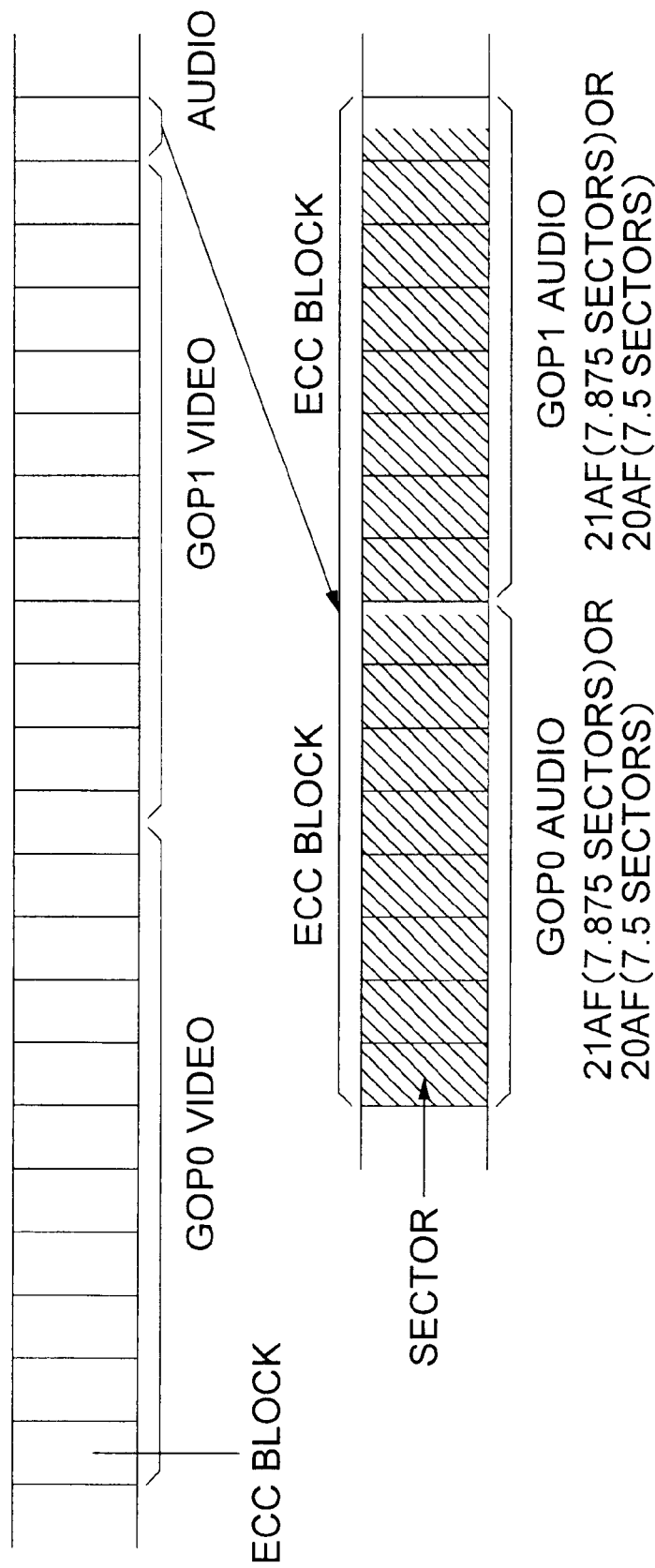
FIG. 25 is a diagram of an audio data arrangement.

An audio data arrangement is shown in FIG. 25. As shown in FIG. 25, audio 21 AFs or 20 AFs are assigned to video 1 GOP, and either of the 21 AFs or the 20 AFs are arranged in eight sectors. In this manner, a video GOP and an audio AF are not completely synthesized with each other, the offset therebetween is suppressed to 0.5 AF (0.012 sec) or less. Audio corresponding to one GOP is assigned to the first eight sectors or the second eight sectors of the ECC block, and data of two GOP are arranged in one ECC block. In each of the first eight sectors and the second eight sectors of the ECC block, the last remaining portion is buried with stuffing bits.

As post-recording edition, two types of editions, i.e., edition in units of two GOP (one ECC block) and edition in units of one GOP may be considered. At this time, a muting mark (or fade in/out mark) is formed at a connection portion between GOP audio which is not edited and GOP audio which is edited. In this manner, reading edition for reading data once and re-recording the data after edition is not required, and smooth connection can be realized. Although this muting mark is not omitted in the drawing or the like, the muting mark may be arranged on FID3 to FID0or the like in GIM of MAP data. Since video/audio require muting before and after an edited portion to suppress click noise, this method may be an optimum editing method.

Figure 26:
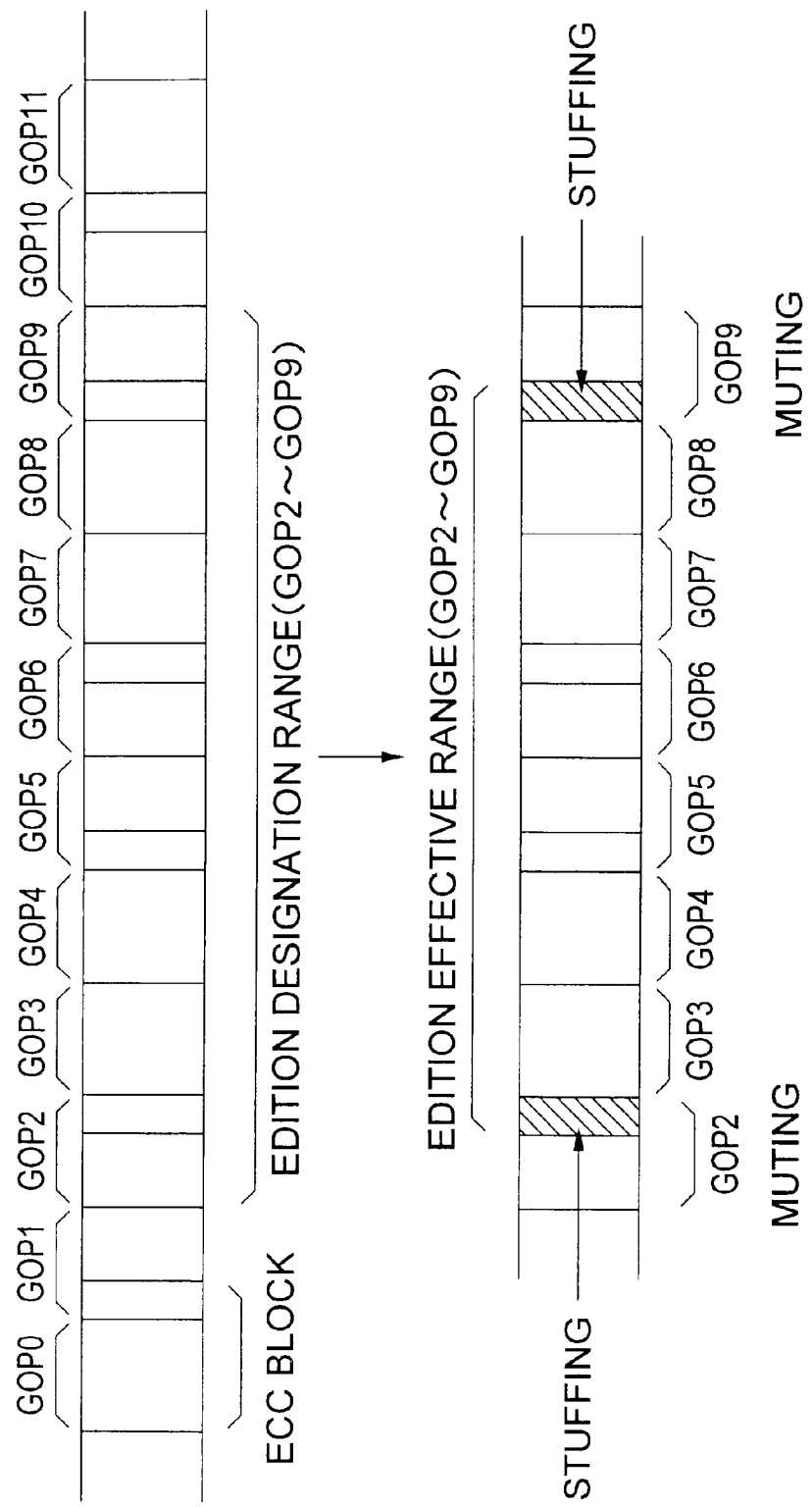
FIG. 26 is a diagram for explaining a post-recording edition.

Also, when another bit rate is $2^i$ (kbits), alignment with an ECC block is performed in units of integer GOP, reading edition in which reading/partial updating/writing are performed, a recording process in units of ECC blocks can be performed. In case of a bit rate except for the bit rate of $2^i$ (kbps), for example, 384 kbps, audio of four GOP has three ECC blocks. In such a case, edition (post-recording) may be performed by the two following manners. One of them is edition performed in units of four GOP (three ECC block), and the other uses a muting mark (or fade in/out mark) as described above when edition is performed in units of GOP. In this manner, reading edition is not required, and smooth connection can be realized. An edition example obtained in this case is shown in FIG. 26. FIG. 26 shows only audio data. Audio data corresponding to COP3 are updated to audio data corresponding to GOP8. In GOP2 and GOP9 at the connection portions, muting is made to prevent click noise at the connection portions.

Figure 27:
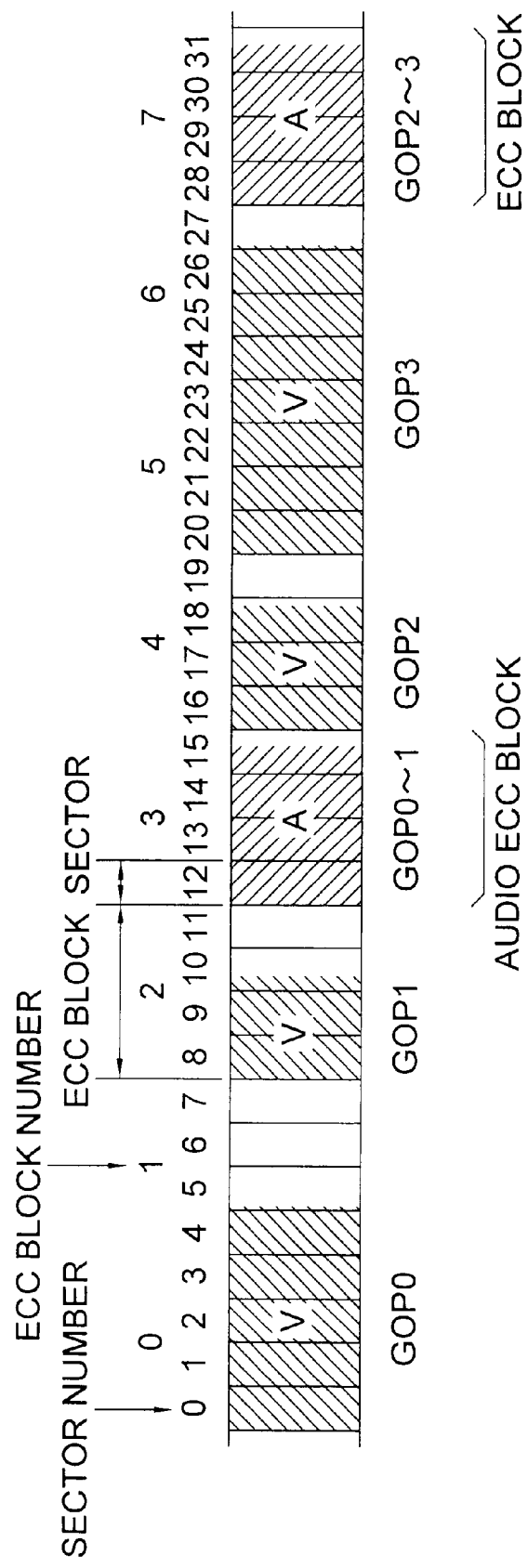
FIG. 27 is a diagram for explaining an arrangement of video GOP and audio frames.

FIG. 27 shows an arrangement of video GOP and audio frames. In FIG. 27, as video, GOP0 to GOP1 and GOP2 to GOP3 are arranged in the 0th to second ECC blocks and the fourth to sixth ECC blocks, respectively. Video data are indicated by thick hatched portions. In contrast to this, in audio, MPEG-1 and Layer2 are used, and a bit rate of 256 kbps is set. Data corresponding to GOP0 to GOP1 and GOP2 to GOP3 are arranged in the third ECC block and the seventh ECC block, respectively. Audio data are indicated by thin hatched portions. In FIG. 26, for descriptive convenience, four sectors in FIG. 24 are shown as one sector (8,192 bytes). At this time, MAP data is as follows:

| GIM | GNR: | 0 | 1 | 2 | 3 |
|---|---|---|---|---|---|
| | SNR: | 0 | 8 | 16 | 20 |
| | AOF: | 0 | 0 | 0 | 0 |
| | AFR: | 0 | 1 | 0 | 1 |

It is represented that "audio data for GOP0 is arranged at the 0th (first) position from the start an audio ECC block (third ECC block) appearing at the 0th (first) position counted from GOP0, audio data for GOP1 is arranged at the 1st (next to the first) position from the start of the audio ECC block (third ECC block) appearing at the 0th (first) position counted from GOP1, audio data for GOP2 is arranged at the 0th (first) from the start of an audio ECC block (seventh ECC block) appearing at the 0th (first) counted from GOP2, and audio data for GOP3 is arranged at the 1st (next to the first) from the start of the audio ECC block (seventh ECC block) appearing at the 0th (first) counted from GOP3". Since an additional recording operation, an erasing operation, and a merge operation are the same as those described in FIGS. 18, 19, and 20, the overlapping description is omitted.

Figure 28:
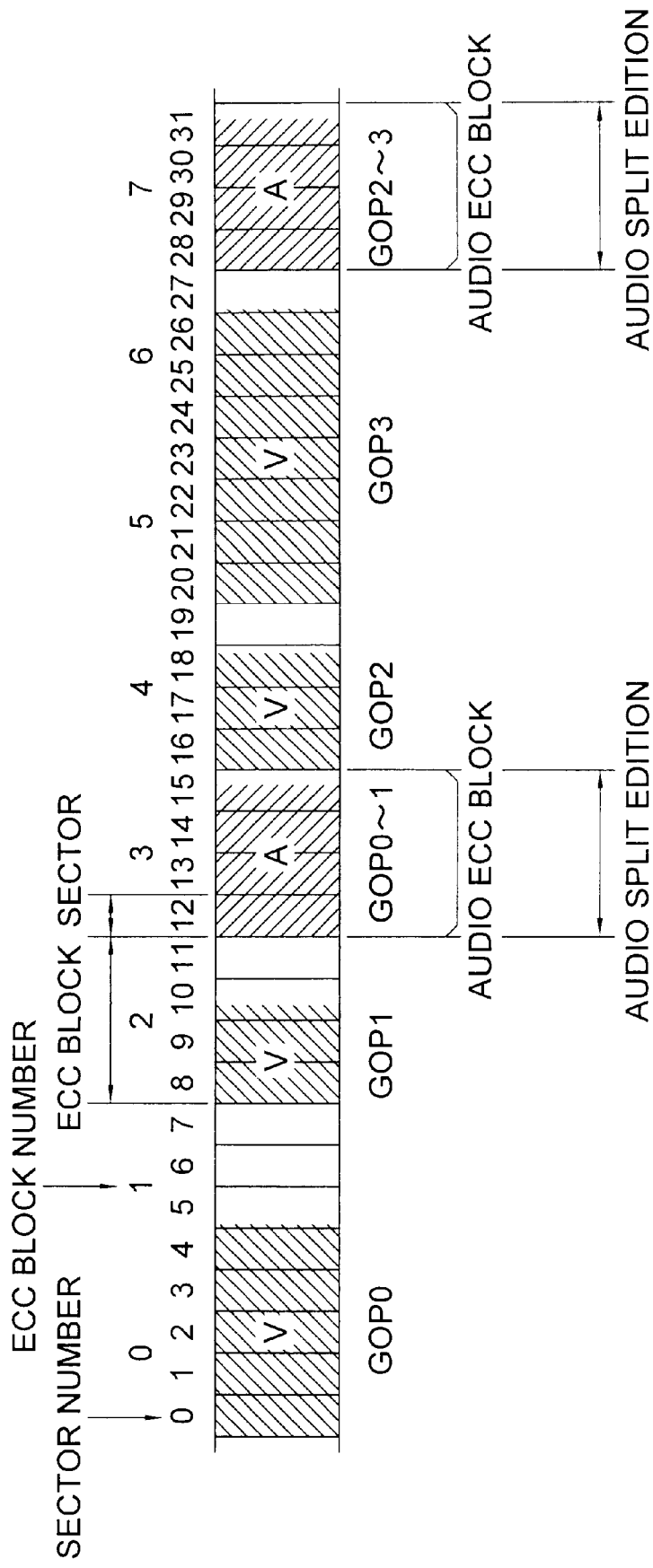
FIG. 28 is a diagram for explaining recorded data in video/audio split edition and audio post-recording.

Split edition for independently editing video/audio and post-recording edition (post-recording) for recording only audio after video recording will be described below with reference to recording data shown in FIG. 28. Since an amount of code per audio frame is fixed, the amount of code is not increased by audio split edition and post-recording, and additional recording is not performed to another region. Therefore, when ECC blocks to which an audio frame for GOP subjected to split edition belongs are edited in units of two GOP, for example, when GOP0 to GOP3 are edited, overwriting on the third and seventh ECC blocks is performed. When edition is performed in units of one GOP, for example, when GOP1 to GOP2 are edited, the following method may be used. That is, the data of the third to seventh ECC blocks are read, and ECC is added to perform overwriting after only audio data corresponding to GOP1 and GOP2 are updated. As another method, reading is not performed, and muting marks are added to data corresponding to GOP0 and GOP3 to perform overwriting on the third and seventh ECC blocks is also known. Although this muting mark is not omitted in the drawing or the like, the muting mark may be arranged on FID3 to FID0or the like in GIM of MAP data. Disk control data is not changed before and after edition, and has the following values:

| GIM | GNR: | 0 | 1 | 2 | 3 |
|---|---|---|---|---|---|
| | SNR: | 0 | 8 | 16 | 20 |
| | AOF: | 0 | 0 | 0 | 0 |
| | AFR: | 0 | 1 | 0 | 1 |

When a plurality of GOP are defined as chapters, split edition and post-recording edition may be performed in units of chapters.

Figure 29:
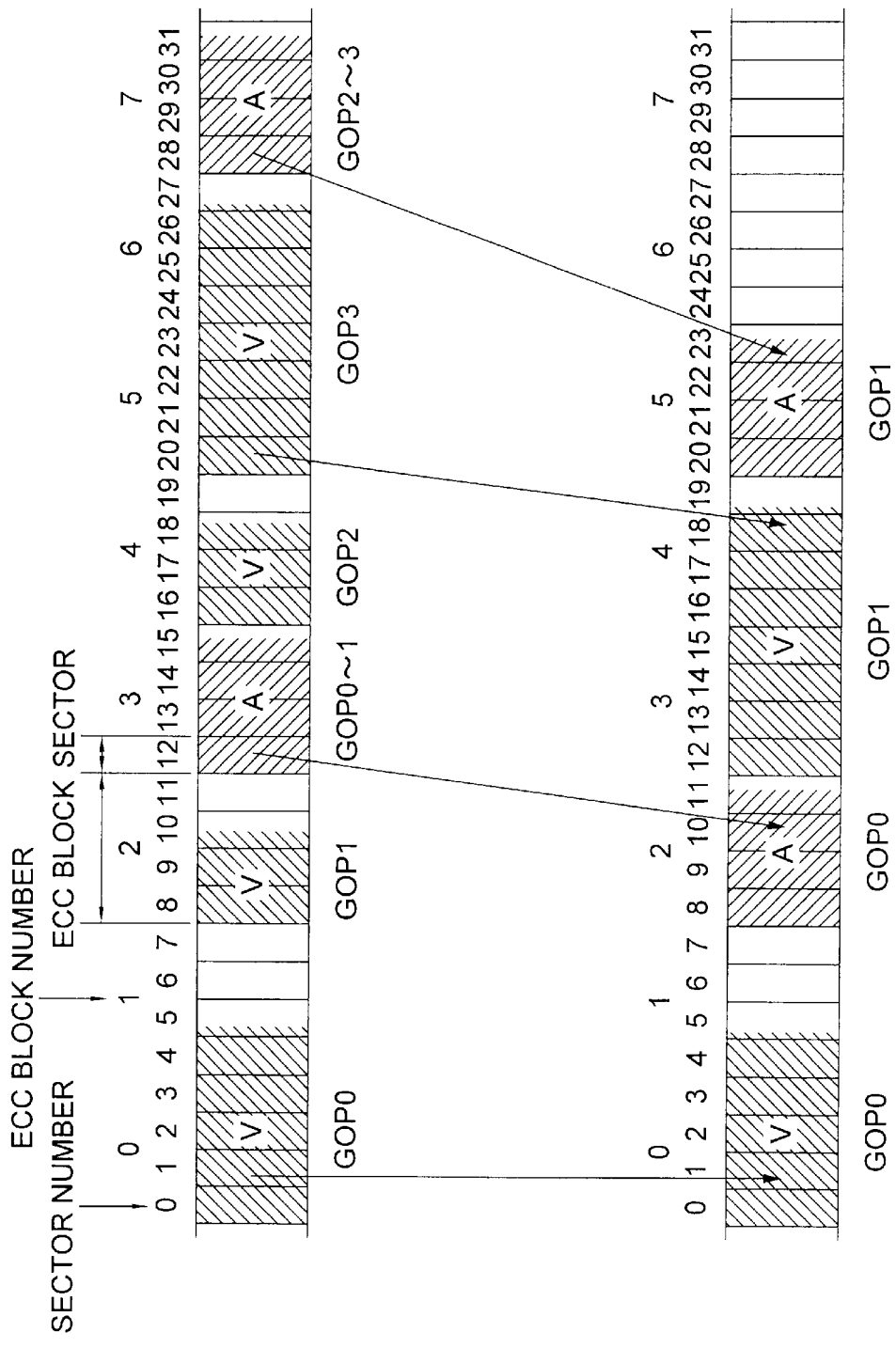
FIG. 29 is a diagram for explaining recorded data in video/audio moving edition.

Moving edition in units of video/audio GOP will be described below with reference to recording data shown in FIG. 29. In FIG. 29, MAP data obtained before moving edition is as follows:

| GIM | GNR: | 0 | 1 | 2 | 3 |
|---|---|---|---|---|---|
| | SNR: | 0 | 8 | 16 | 20 |
| | AOF: | 0 | 0 | 0 | 0 |
| | AFR: | 0 | 1 | 0 | 1 |

The moving edition is performed as shown in FIG. 29. The MAP data obtained after the moving edition is as follows:

| GIM | GNR: | 0 | 1 |
|---|---|---|---|
| | SNR: | 0 | 12 |
| | AOF: | 0 | 0 |
| | AFR: | 0 | 0 (1) |

In the MAP data, in the sixth ECC block and the seventh ECC block of original data, data may be actually erased, or may not be erased.

When the data are actually erased, an ECC block to be erased is buried with stuffing bytes. At this time, the original recorded data disappear. When the data are not actually erased, all the data are not changed. In play-back, erasing of the data is determined by only MAP data. When new data is recorded on the portion, actual erasing is performed. After the erasing operation, the following merit can be obtained. That is, before actual erasing by recording the new data on the portion, the erased data can be recovered. Audio data corresponding to GOP1 in the second ECC block and GOP2 in the fifth ECC block may be actually erased, or may not be erased. When the data are actually erased, a sector to be erased is buried with stuffing bytes, and ECC is added to the sector to perform overwriting. At this time, when GNR: 1 after edition, AFR: 0 is set. In this case, when audio data corresponding to GOP2 is erased, a recording sector position in the ECC block of audio data corresponding to GOP3 may be moved to the start portion. When the data are not actually erased, all the data are not changed. In play-back, erasing of the data is determined by only MAP data. At this time, audio data corresponding to original GOP1 and GOP2 remain. For this reason, when GNR: 1 after edition, AFR: 1 is set. In this case, the remaining audio data are not erased.

Moving edition in units of chapters will be described below. In FIG. 29, GOP0 to GOP3 obtained before edition are replaced with chapter 0 to chapter 3, respectively, and GOP0 and GOP3 obtained after edition are replaced with chapter 0 and chapter 3, respectively. At this time, MAP data is as follows:

| GIM | GNR: | 0 | 1 |
|---|---|---|---|
| | SNR: | 0 | 12 |
| | AOF: | 0 | 0 |
| | AFR: | 0 | 0 (1) |
| CIM | CNR: | 0 | 1 |
| | CSG: | 0 | 1 |
| | CTG: | 1 | 1 |

It is represented that "moving edition is performed to GOP0 and GOP1, and chapter 0 and chapter 1 are equal to GOP0 and GOP1, respectively".

Figure 30:
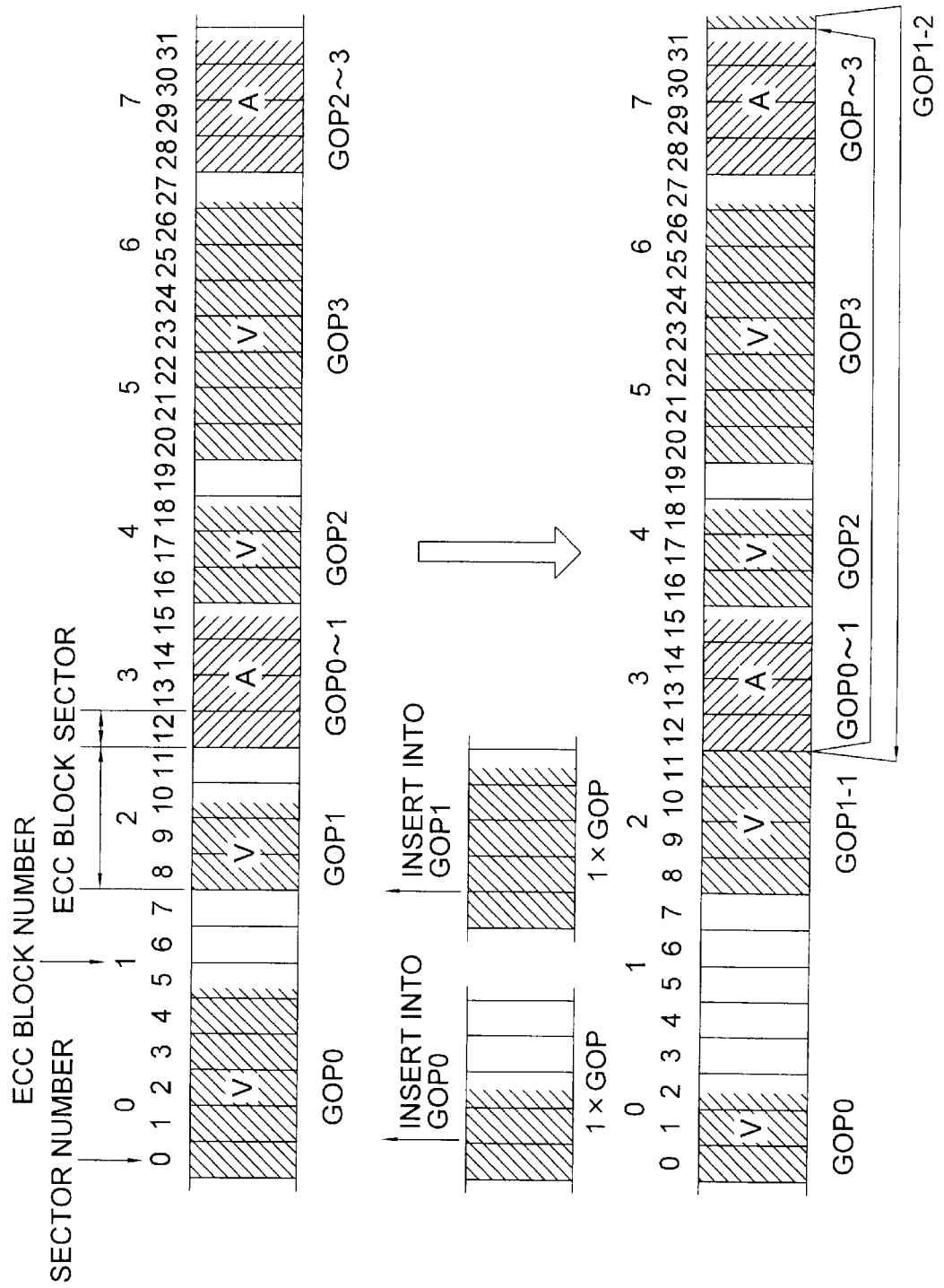
FIG. 30 is a diagram for explaining recorded data in video/audio insert edition.
Figure 31:
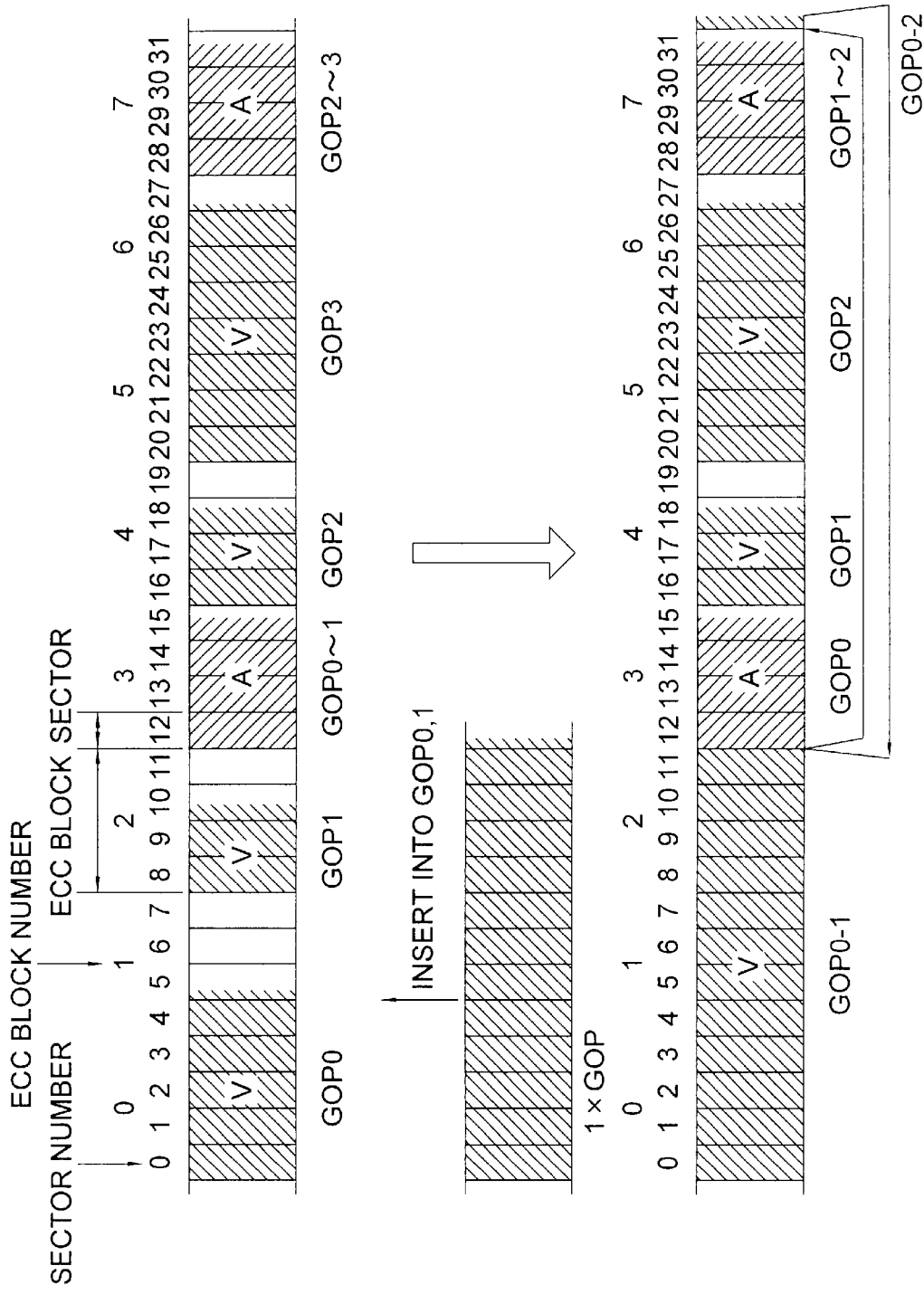
FIG. 31 is a diagram for explaining recorded data in video/audio insert edition.
Figure 32:
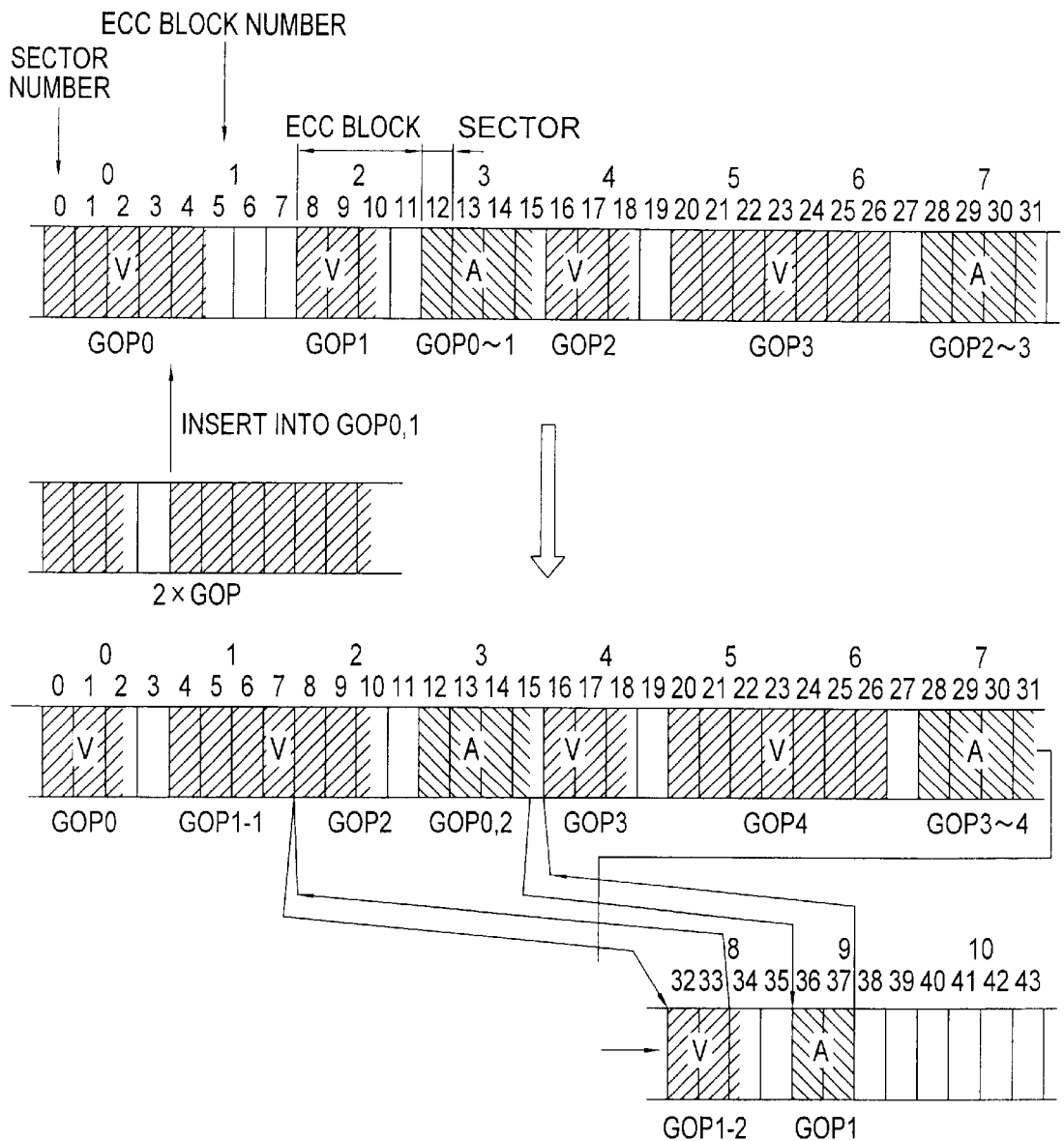
FIG. 32 is a diagram for explaining recorded data in video/audio insert edition.

Video/audio insert edition will be described below. FIG. 30 shows recorded data obtained when the number of GOP to be inserted is equal to the number of original GOP. FIG. 31 shows recorded data obtained when the number of GOP to be inserted is larger than the number of original GOP. In FIGS. 30 to 32, GOP0 to GOP3 are recorded before insert edition, disk control data is as follows:

| GIM | GNR: | 0 | 1 | 2 | 3 |
|---|---|---|---|---|---|
| | SNR: | 0 | 8 | 16 | 20 |
| | AOF: | 0 | 0 | 0 | 0 |
| | AFR: | 0 | 1 | 0 | 1 |

In the case that the number of GOP to be inserted is equal to the number of original GOP, when an amount of code of the GOP to be inserted is smaller than an amount of code of the original GOP. In this example, insert edition is performed as in GOP0. When an amount of code of the GOP to be inserted is larger than an amount of code of the original GOP, the original GOP is entirely buried. Thereafter, the remaining data are written at another unrecorded position. The remaining part of the ECC block is buried with stuffing. In this example, GOP1 is divided into two parts. The first GOPL-1 is recorded on the second ECC block, and the subsequent GOP1-2 is recorded on the eighth ECC block.

Audio is subjected to only updating because an audio frame has a fixed length. In this example, an audio frame corresponding to GOP0 and an audio frame corresponding to GOP1 in the third ECC block are updated. Assume that GOP0 to GOP2 are defined as file 1, and that GOP3 is defined as file 2. In this case, an edition jump information mode (EJP) of a CON file is as follows:

| EJP | IFN: | 1 |
|---|---|---|
| | ISN: | 11 |
| | EFN: | 1 |
| | ESN: | 32 |
| | ETS: | 4 |

Since edition is performed in units of ECC blocks, ETS: 4 may be set. When data to be inserted has only one sector as shown in the drawing, ETS: 1 may be set. The CON file (EJP) represents that one sector to four sectors (one ECC block) are inserted from sector number 32 into a position after sector number 11. The MAP data is the same as that obtained before edition.

On the other hand, in the case that the number of GOP to be inserted is smaller than the number of original GOP, when an amount of code of the GOP to be inserted is smaller than an amount of code of the original GOP, although not shown, the remaining bytes are buried with stuffing after insert edition. When an amount of code of the GOP to be inserted is larger than an amount of code of the original GOP, the original GOP is entirely buried. Thereafter, the remaining data are written at another unrecorded position. The remaining part of the ECC block is buried with stuffing. In this example, GOP0 is divided into two parts. The first GOP0-1 is recorded on the 0th to second ECC blocks, and the subsequent GOP0-2 is recorded on the eighth ECC block.

Audio is subjected to only updating because an audio frame has a fixed length. In this example, an audio frame corresponding to GOP0 in the third ECC block is updated. Assume that GOP0 to GOP1 are defined as file 1, and that GOP2 is defined as file 2. In this case, a MAP file is as follows:

| GIM | GNR: | 0 | 1 | 2 |
|---|---|---|---|---|
| | SNR: | 0 | 16 | 20 |
| | AOF: | 0 | 0 | 0 |
| | AFR: | 0 | 0 | 1 |

An edition jump information mode (EJP) of a CON file is as follows:

| EJP | IFN: | 1 |
|---|---|---|
| | ISN: | 11 |
| | EFN: | 1 |
| | ESN: | 32 |
| | ETS: | 4 |

Since edition is performed in units of ECC blocks, ETS: 4 may be set. When data to be inserted has only one sector as shown in the drawing, ETS: 1 may be set. The CON file (EJP) represents that one sector to four sectors (one ECC block) are inserted from sector number 32 into a position after sector number 11.

In the case that the number of GOP to be inserted is larger than the number of original GOP, when an amount of code of the GOP to be inserted is smaller than an amount of code of the original GOP, although not shown, the remaining bytes are buried with stuffing after insert edition. When an amount of code of the GOP to be inserted is larger than an amount of code of the original GOP, the original GOP is entirely buried. Thereafter, the remaining data are written at another unrecorded position. The remaining part of the ECC block is buried with stuffing. In this example, GOP0 is recorded on the 0th ECC block. GOP1 is divided into two parts. The first GOP1-1 is recorded on the fourth ECC block, and the subsequent GOP1-2 is recorded on the eighth ECC block.

Since the number of audio frames increases, audio is additionally recorded on an unused ECC block. In this example, an audio frame corresponding to GOP0 in the 0th ECC block is updated, and an audio frame corresponding to GOP1 is added. However, since the third ECC block has no spare space, the audio frame is added to the ninth ECC block. As an audio frame corresponding to GOP2, recorded data is used without being changed. Assume that GOP0 to GO21 are defined as file 1, and that GOP3 to GOP4 are defined as file 2. In this case, a MAP file is as follows:

| GIM | GNR: | 0 | 1 | 2 | 3 | 4 |
|---|---|---|---|---|---|---|
|  | SNR: | 0 | 4 | 8 | 16 | 20 |
|  | AOF: | 0 | 1 | 0 | 0 | 0 |
|  | AFR: | 0 | 0 | 1 | 0 | 1 |

An edition jump information mode (EJP) of a CON file is as follows:

| EJP | IFN: | 1 | 1 |
|---|---|---|---|
|  | ISN: | 7 | 15 |
|  | EFN: | 1 | 1 |
|  | ESN: | 32 | 36 |
|  | ETS: | 4 | 4 |

Since edition is performed in units of ECC blocks, ETS: 4 may be set. When data to be inserted has only one sector as shown in the drawing, ETS: 1 may be set. The CON file (EJP) represents the follows. "In video, one sector to four sectors (one ECC block) are inserted from sector number 32 into a position after sector number 7. In audio, one sector to four sectors (one ECC block) are inserted from sector number 36 into a position after sector number 15. Since audio for GOP1 exists in the second audio ECC block with reference to GOP1, the audio exists in the start portion of the ninth ECC block inserted into a position after the first audio ECC block (third ECC block)."

A procedure of the control ECC block recording and control ECC block play-back described above will be described below with reference to FIG. 2. In recording, the input 3101 serving as a video/audio signal is subjected to compression coding and multiplexing by the video/audio coding circuit 3102 to constitute a stream. Shuffling, ECC addition, and record coding are performed by the recording signal processing circuit 3103. A control file (MAP file and CON file) is generated by causing the CPU control circuit 3104 to control the control ECC block addition circuit 3105. After the generation, the control file is sent to the recording signal processing circuit 3103. The CPU control circuit 3104 controls an optical head, a spindle motor, and the like at once. In the recording signal processing circuit 3103, a video/audio file (VAS file) and the control file are multiplexed. Thereafter, these data are recorded from the optical head 3106 onto the disk 3107.

On the other hand, in play-back, data played back from the disk 3107 by the optical head 3106 is subjected to recorded code decoding, error correction, and deshuffling by the play-back signal processing circuit 3108. The video/audio file is sent to the video/audio decoding circuit 3110, and the control file is sent to the control ECC playing-back circuit 3109. The control file is decoded by the control ECC block playing-back circuit 3109. The decoded data is sent to the CPU control circuit 3104. The CPU control circuit 3104 controls the optical head, the spindle motor, and the like on the basis of the data and an execution instruction. The video/audio data sent to the video/audio decoding circuit 3110 is subjected to separation and decoding to be output as the video/audio signal 3111.

The video compression method described above may be a method except for MPEG-2, and a non-compression method may be used. An audio compression method may be a method except for MPEG-1, and a non-compression method may be used. The numbers of bytes of a sector and an ECC block are not limited to 2 (partially, 8) Kbytes and 32 Kbytes. Although 1 ECC block=4 sectors is satisfied, other values may be set. In addition, although the above description is related to video/audio, sub-pictures, user data, and other data can be described with the same relationship as that of the illustrated video/audio. Although GOP is aligned with an ECC block, GOP may be aligned with sectors, may be aligned with the other objects, or may not be aligned. Although a Pack length is set according to an ECC block, the Pack length may not be set according to the ECC block. The Pack length may be set according to a sector, and the Pack length may be set according to other objects.

As has been described above, according to the present invention, in a recording data block to which an ECC is attached in units of ECC blocks, in addition to a data ECC block, a control ECC block is formed. In recording, a main data group number, a sector number at which the main data group is started, data representing the specific number of a sub-data ECC block at which sub-data synthesized with the main data group, and data representing the specific number of a data block, in which the sub-data exists, in the sub-data ECC block are arranged in the control ECC block. In play-back, in order to insert data blocks at different positions, a file number of an insertion source, a main data group number of the insertion source, a file number subjected to merge addition, a main data group number subjected to merge addition, and the number of main data groups subjected to merge addition are read from the control ECC block. In edition recording, in order to insert data blocks at different positions, a file number of an insertion source, a sector number of the insertion source, a file number subjected to edition addition, a sector number subject to edition addition, and the number of sectors subjected to edition addition are arranged in the control ECC block. In this manner, for updated data, high-speed and accurate header searching, a fast play-back, a rewind play-back, and a slow-motion play-back which are high-quality special play-backs, edition, and the like can be easily realized.

While this invention has thus far been described in conjunction with the preferred embodiments thereof, it will readily be possible for those skilled in the art to put this invention into practice on various other manners.

What is claimed is:

1. A device for carrying out record and play-back, comprising:

a video/audio coding circuit for performing compression coding and multiplexing of an input video/audio signal;

a control error correction code block generating circuit for generating a control error correction code block under the control of a central processing unit control circuit;

a recording signal processing circuit for performing shuffling, addition of an error correction code, and record coding to an output signal of said the video/audio coding circuit and for multiplexing said video/audio signal and said control error correction code block;

an optical head for recording output data of the recording signal processing circuit on a disk;

a play-back signal processing circuit for performing record code decoding, error correction, and deshuffling to data played back from the disk by the optical head;

a video/audio decoding circuit for decoding video/audio data on the basis of an output of said play-back signal processing circuit to output the video/audio data as a video/audio signal; and a control error correction code block playing-back circuit for playing back a control error correction code block on the basis of an output of said play-back signal processing circuit and for causing the central processing unit control circuit to control the optical head and a spindle motor on the basis of the control error correction code block and an execution instruction.

2. A recording/playing-back device as claimed in claim 1, wherein said control error correction code block has a program map file and a program connection file which constitute a control error correction code file.

3. A method of carrying out record and play-back, comprising the steps of:

performing compression coding and multiplexing to an input video/audio signal in a video/audio coding circuit;

generating a control error correction code block from a control error correction code block generating circuit under the control of a central processing unit control circuit;

performing shuffling, addition of an error correction code, and record coding to an output signal of said video/audio coding circuit and multiplexing said video/audio signal and said control error correction code block by a recording signal processing circuit;

recording the multiplexed data on a disk by an optical head;

performing record code decoding, error correction, and deshuffling to data played back from the disk by the optical head in a play-back signal processing circuit;

causing a video/audio decoding circuit to decode video/audio data on the basis of an output of said play-back signal processing circuit;

causing a control error correction code block playing-back circuit to play back a control error correction code block on the basis of an output of said play-back signal processing circuit; and causing said central processing unit control circuit to control said optical head and a spindle motor on the basis of said control error correction code block and an execution instruction.

4. A recording/playing-back method as claimed in claim 3, wherein:

said control error correction code block stores an insertion source file number, an insertion source main data group number, a merge addition file number, a merge addition main data group number, and the number of merge addition main data groups;

said method comprising the step of merging data in the same file and data in different files in units of main data groups to carry out an edition of merge edition mode on the basis of change in play-back order.

5. A recording/playing-back method as claimed in claim 4, wherein a control file is defined as said control error correction code block.

6. A recording/playing-back method as claimed in claim 4, wherein a main/sub-file is defined as the main/sub-data.

7. A recording/playing-back method as claimed in claim 4, wherein said method comprises the steps of:

filling the remaining bits of the error correction code block with stuffing bits when a main data group is ended in the way of said error correction code block; and starting on a new main data group in the head of a next error correction code block.

8. A recording/playing-back method as claimed in claim 4, wherein a pack length of said main data group is equal to a length of said error correction code block.

9. A recording/playing-back method as claimed in claim 4, wherein said method comprises the steps of:

updating said control error correction code block or said control file on erasing; and judging that the data is erased on the basis of said control error correction code block or said control file on play-back.

10. A recording/playing-back method as claimed in claim 4, wherein said method comprises the step of selecting a plurality of different play-back orders of recorded data in accordance with said control error correction code block or said control file to play back a plurality of stories.

11. A recording/playing-back method as claimed in claim 4, wherein said method comprises the step of recording remaining sectors of a new data group in an unrecorded region when said new data group has sectors in number greater than sectors of recorded data group, on updating said recorded data group into said new data group.

12. A recording/playing-back method as claimed in claim 4, wherein a data block is used as said unrecorded region, said data block being judged as an erased data block on play-back.

13. A recording/playing-back method as claimed in claim 4, wherein said method comprises the steps of:

arranging sub-data corresponding to main data groups of M to error correction code blocks of N, where M is a positive integer which is greater than two and N is a positive number which is greater than two; and filling remaining bits with stuffing bits.

14. A recording/playing-back method as claimed in claim 13, wherein said method comprises the steps of:

arranging sub-data corresponding to one main data group at one-(integer)-th of one error correction code block in each sector; and filling remaining bits with stuffing bits in each sector.

15. A recording/playing-back method as claimed in claim 14, wherein said method comprises the step of carrying out a split edition or a post-recording edition in each sub-data group in one error correction code block.

16. A recording/playing-back method as claimed in claim 13, wherein said method comprises the step of carrying out a split edition or a post-recording edition in each sub-data group in said error correction code blocks of N.

17. A recording/playing-back method as claimed in claim 13, wherein said method comprises the steps of:

carrying out a muting at a connection between sub-data corresponding to a non edited main data group and sub-data corresponding to an edited main data group; and carrying out a noiseless edition in each sub-data groups corresponding to one main data group.

18. A recording/playing-back method as claimed in claim 17, wherein said method comprises the steps of:

setting invalid data and a muting mark to said sub-data corresponding to said non edited main data group; and carrying out a split edition and a post-recording edition without reading edition.

19. A recording/playing-back method as claimed in claim 4, wherein said method comprises the step of arranging said main data and said sub-data on different error correction blocks, respectively, said main data continuing before and after said sub-data error correction code block, said sub-data continuing between said sub-data groups spaced apart from each other.

20. A recording/playing-back method as claimed in claims 4, said method comprises the steps of:
dividing asynchronous main data into main data groups;
dividing asynchronous sub-data into sub-data groups;
synchronizing said main data groups with said sub-data groups to update at least one main data group and sub-data groups synchronized with said main data group.

21. A recording/playing-back method as claimed in claim 4, said main data and said sub-data being recorded on said disk, one main data group corresponding to a plurality of error correction code blocks, a plurality of sub-data groups corresponding to one error correction code block, wherein said method comprises the step of carrying out again recording after only necessary main data except for unnecessary main data and necessary sub-data except for unnecessary sub-data in the error correction code block are rearranged, when said main data and said sub-data are partially recorded again.

22. A recording/playing-back method as claimed in claims 4, wherein said method comprises the step of recording, on said unrecorded region in concern to each main/sub-data group, data which are not recorded on original data groups, in case the number of recorded main/sub-data groups is greater than the number of a new main/sub-data groups on updating said recorded main/sub-data groups to said new main/sub-data groups.

23. A recording/playing-back method as claimed in claims 4, wherein said main data, said main data group, said sub-data, and the sub-data group are defined as said video data, a video GOP, said audio data, and an audio frame data, respectively.

24. A recording/playing-back method as claimed in claim 3, wherein:
said control error correction code block stores an insertion source file number, an insertion source chapter number, a merge addition file number, a merge addition chapter number, and the number of merge addition chapters;
said method comprising the step of merging data in the same file or data in different files in units of chapters to carry out an edition of a chapter merge edition mode on the basis of change in play-back order.

25. A recording/playing-back method as claimed in claim 3, wherein:
said control error correction code block stores a jump source file number, a jump source main data group number, a jump destination file number, and a jump destination main data group number;
said method comprising the step of carrying out jumping in the same file or in different files in units of main data groups to perform an edition of a main data group jump mode on the basis of change in play-back order.

26. A recording/playing-back method as claimed in claim 3, wherein:
said control error correction code block stores a jump source file number, a jump source chapter number, a jump destination file number, and a jump destination chapter number;
said method comprising the step of carrying out jumping in the same file or in different files in units of chapters to perform an edition of a chapter jump mode on the basis of change in play-back order.

27. A recording/playing-back method as claimed in claim 3, wherein:
said control error correction code block stores an insertion source file number, an insertion source sector number, an edition addition file number, an edition addition sector number, and the number of edition addition sectors;
said method comprising the steps of:
carrying out an insertion edition of data in the same file or in different files;
varying an order of play-back in each error correction code block; and
performing an edition of an edition jump information mode on the disk.

28. A recording/playing-back method as claimed in claim 3, wherein:
said control error correction code block stores an insertion source sub-data file number, an insertion source sub-data error correction code block number, an edition addition sub-data file number, an edition addition sub-data error correction code block number, an insertion source sub-data group number, and the number of edition addition sub-data groups;
said method comprising the step of varying an order of play-back in each sub-data groups to perform a sub-data jump information mode.

29. A recording/playing-back method as claimed in claim 3, wherein:
said control error correction code block stores a main data group number, a sub-data offset, a sub-data group, and a sector number;
said method comprising the step of detecting a group address of main/sub-data corresponding to said control error correction code block.

30. A recording/playing-back method as claimed in claim 3, wherein:
said control error correction code block stores a chapter number, a start main data group number corresponding to said chapter number, and the total number of main data groups corresponding to said chapter number;
said method comprising the step of detecting chapter information in accordance with said control error correction code block.

31. A recording/playing-back method as claimed in claim 3, wherein:
said control error correction code block stores an erasing start sector number and an erasing offset;
said method comprising the steps of:
making an erasing position be clear after partial erasing to use an erased error correction block again.

* * * * *